United States Patent
Vamaraju et al.

(10) Patent No.: US 10,159,007 B2
(45) Date of Patent: Dec. 18, 2018

(54) METHODS AND SYSTEMS FOR A RANGING PROTOCOL

(71) Applicant: QUALCOMM Incorporated, San Diego, CA (US)

(72) Inventors: Santosh Vamaraju, San Jose, CA (US); Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 15/342,992

(22) Filed: Nov. 3, 2016

(65) Prior Publication Data

US 2017/0134978 A1 May 11, 2017

Related U.S. Application Data

(60) Provisional application No. 62/252,743, filed on Nov. 9, 2015, provisional application No. 62/252,361, filed on Nov. 6, 2015.

(51) Int. Cl.
*H04W 24/10* (2009.01)
*H04W 64/00* (2009.01)
*H04W 88/02* (2009.01)

(52) U.S. Cl.
CPC .......... *H04W 24/10* (2013.01); *H04W 64/00* (2013.01); *H04W 88/02* (2013.01)

(58) Field of Classification Search
CPC .............................. H04W 24/10; H04W 88/02
See application file for complete search history.

(56) References Cited

U.S. PATENT DOCUMENTS

| | | | |
|---|---|---|---|
| 2014/0355461 A1 | 12/2014 | Aldana et al. | |
| 2015/0237568 A1* | 8/2015 | Park .................. | H04W 48/16 370/338 |
| 2015/0319631 A1* | 11/2015 | Aldana ............... | H04W 64/00 370/252 |

OTHER PUBLICATIONS

Hart B., "Location Related Comments; 11-14-0526-00-000m-location-related-comments", IEEE Draft; 11-14-0526-00-000m-Location-Related-Comments, IEEE-SA Mentor, Piscataway, NJ, USA, vol. 802.11m, Apr. 29, 2014 (Apr. 29, 2014), pp. 1-10, XP068069204, [retrieved on Apr. 29, 2014] p. 5, paragraph 8.4.2.44-p. 7, paragraph 10.11.10.3.
International Search Report and Written Opinion—PCT/US2016/060720—ISA/EPO—dated Feb. 8, 2017.
Hart B., (Cisco Systems): "Location Related Comments", IEEE Draft; IEEE 80211-13/1509r6, Mar. 18, 2014, pp. 1-27, XP068068824.

* cited by examiner

*Primary Examiner* — Siming Liu
(74) *Attorney, Agent, or Firm* — Hunter Clark PLLC

(57) ABSTRACT

Disclosed are methods, systems and devices for obtaining a range between devices based, at least in part, on an exchange of wireless messages. For example, wireless devices may obtain measurements of range based, at least in part, on an exchange fine timing measurement (FTM) messages during sessions. In one implementation, an initiating wireless station may transmit an initial FTM request message to a responding wireless station wherein the initial FTM request message comprising one or more fields indicating a capability of the initiating STA to generate Range Reports.

16 Claims, 18 Drawing Sheets

| B0 B1(#3267) | B2(#3267) B6 | B7(#3267) | B8 | B11 B12 | B15 B16 | B23 B24 | B39 |
|---|---|---|---|---|---|---|---|
| Status Indication | Value | Reserved (#3267) | Number of Bursts Exponent | Burst Duration (#3463) | Min Delta FTM | Partial TSF Timer | |

Bits: 2 5 1 4 4 8 16

| B40 | B41 | B42 | B43 B47 | B48 B49 | B50 B55 | B56 B71 |
|---|---|---|---|---|---|---|
| Partial TSF Timer No Preference (M157) | ASAP Capable (#3112) | ASAP (#3112) | FTMs per Burst | Reserved | FTM Format And Bandwidth (#3464) | Burst Period |

Bits: 1 1 1 5 2 6 16

Fine Timing Measurement Parameters (#3465)(M56) field format

FIG. 7

| Category | Public (#2164) Action | Trigger | LCI Measurement Request (optional) | Location Civic Measurement Request (optional) | Fine Timing Measurement Parameters (#3465) (optional) |
|---|---|---|---|---|---|
| | | | variable (#2403) | variable (#2403) | variable (#2164) |

Octets: 1 1 1

Fine Timing Measurement Request Action field (#2042) format

FIG. 8

| Element ID=39 | Length | Measurement Token | Measurement Report Mode | Measurement Type=16 | Range Entry Count |
|---|---|---|---|---|---|
| 1 | 1 | 1 | 1 | 1 | 1 |

Octets:

| Range Entry | Error Entry Count | Error Entry | Optional Subelements |
|---|---|---|---|
| Mx15 | 1 | Nx11 | variable |

Octets:

FIG. 9

| infoID=238 | Length= >=3 | Measurement Token !=0 | Measurement Request Mode | Measurement Type = | Measurement Request |
|---|---|---|---|---|---|
| Octets: 1 | 1 | 1 | 1 | 1 | variable |

Number of Repetitions = 0 (1 iteration)

Measurement Request element of Measurement Type = FTM Range Request (element ID = 38, Measurement Type = 16)

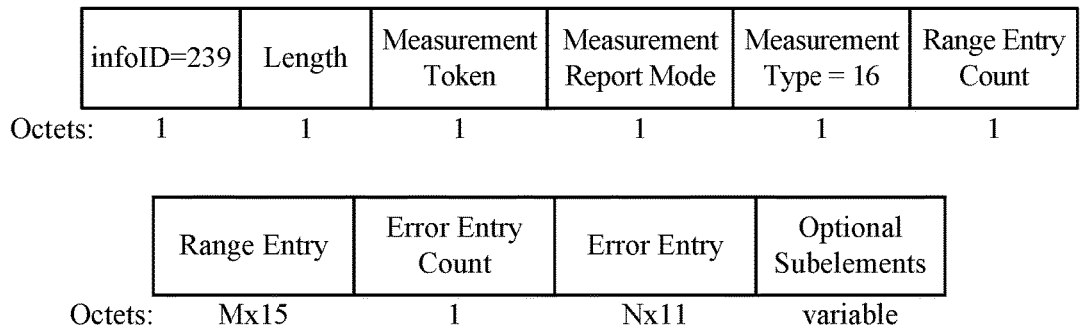
FIG. 12
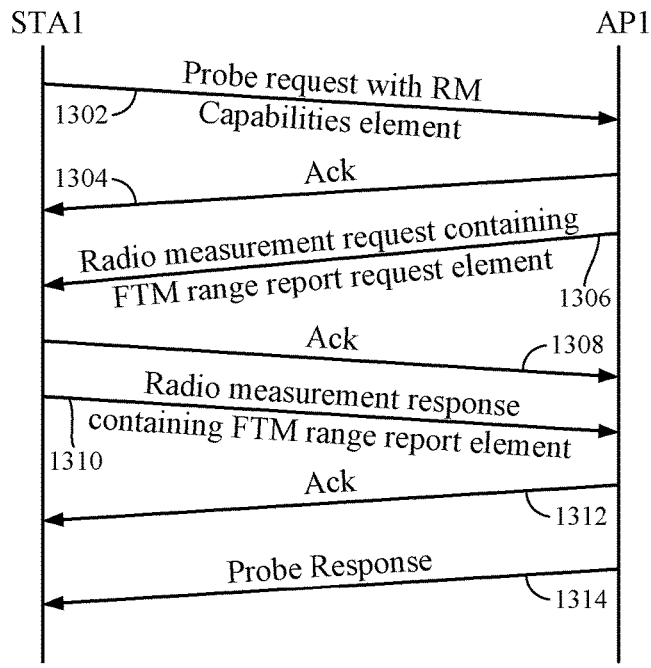
FIG. 13
| RM Enabled Capabilities | The RM Enabled Capabilities element is present if dot11RadioMeasurementActivated is true. |
FIG. 14

METHODS AND SYSTEMS FOR A RANGING PROTOCOL

CROSS-REFERENCE TO RELATED APPLICATIONS

This application claims the benefit of U.S. Provisional Application Nos. 62/252,361, entitled "Methods and Systems for a Ranging Protocol," filed Nov. 6, 2015, and 62/252,743, entitled "Methods and Systems for a Ranging Protocol," filed Nov. 9, 2015, which are assigned to the assignee hereof and which are expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

SUMMARY

Briefly, one particular implementation is directed to a method at a first wireless station comprising: transmitting a fine timing measurement (FTM) request message to a second STA, the FTM request message comprising one or more fields indicating a range report capability of the first STA.

Another particular implementation is directed to a first wireless station (STA), comprising: a wireless transceiver; and a processor coupled to the wireless transceiver to: initiate transmission of a fine timing measurement (FTM) request message through the wireless transceiver to a second STA, the FTM request message comprising one or more fields indicating a capability of the first STA to generate Range Reports.

Another particular implementation is directed to a first wireless station (STA) comprising: means for transmitting afine timing measurement (FTM) request message to a second STA, the initial FTM request message comprising one or more fields indicating a capability of the initiating STA to generate Range Reports; and means for receiving an acknowledgment message transmitted from the second STA in response to the FTM message.

Another particular implementation is directed to a non-transitory storage medium comprising computer readable instructions stored thereon which are executable by a processor of initiating first wireless station (STA) to: initiate transmission of a fine timing measurement (FTM) request message to a second STA, the first FTM request message comprising one or more fields indicating a capability of the first STA to generate Range Reports.

Another particular implementation is directed to a method at a first wireless transceiver device comprises: transmitting a probe request message comprising a radio measurement capabilities element indicating a capability of providing a Range Report; receiving a radio measurement request message comprising one or more fields requesting the Range Report; transmitting a radio measurement response message comprising a Range Report; and receiving a probe response message following transmission of the radio measurement response messages, the probe response message being transmitted in response to the probe request message.

Another particular implementation is directed to a method at a first wireless transceiver device comprising: transmitting a probe request message comprising a radio measurement capabilities element indicating a capability of providing a Range Report; receiving an access network query protocol (ANQP) query message comprising one or more fields requesting the Range Report; transmitting an ANQP response message comprising a Range Report; and receiving a probe response message following transmission of the radio measurement response message, the probe response message being transmitted in response to the probe request message.

Another particular implementation is directed to a first wireless transceiver device comprising: a wireless transceiver; and a processor coupled to the wireless transceiver configured to: initiate transmission of a probe request message through the wireless transceiver comprising a radio measurement capabilities element indicating a capability of providing a Range Report; obtain a radio measurement request message received at the wireless transceiver comprising one or more fields requesting the Range Report; initiate transmission of a radio measurement response message through the wireless transceiver comprising a Range Report; and obtain a probe response message received at the wireless transceiver following transmission of the radio measurement response messages, the probe response message being transmitted in response to the probe request message.

Another particular implementation is directed to a first wireless transceiver device, comprising: a wireless transceiver; and a processor coupled to the wireless transceiver and configured to: initiate transmission of a probe request message through the wireless transceiver comprising a radio measurement capabilities element indicating a capability of providing a Range Report; obtain an ANQP query message received at the wireless transceiver comprising one or more fields requesting the Range Report; initiate transmission of an ANQP response message through the wireless transceiver comprising a Range Report; and obtain a probe response message received at the wireless transceiver following transmission of the radio measurement response message, the probe response message being transmitted in response to the probe request message.

Another particular implementation is directed to a first wireless transceiver device, comprising: means for transmitting a probe request message comprising a radio measurement capabilities element indicating a capability of providing a Range Report; means for receiving a radio measurement request message comprising one or more fields requesting the Range Report; means for transmitting a radio measurement response message comprising a Range Report; and means for receiving a probe response message following transmission of the radio measurement response messages, the probe response message being transmitted in response to the probe request message.

Another particular implementation is directed to a first wireless transceiver device, comprising: means for transmitting a probe request message comprising a radio measurement capabilities element indicating a capability of providing a Range Report; means for receiving an ANQP query message comprising one or more fields requesting the Range Report; means for transmitting an ANQP response message comprising a Range Report; and means for receiving a probe response message following transmission of the radio measurement response message, the probe response message being transmitted in response to the probe request message.

Another particular implementation is directed to a non-transitory storage medium comprising computer readable instructions stored thereon which are executable by a processor of a first wireless transceiver device to: initiate transmission of a probe request message comprising a radio measurement capabilities element indicating a capability of providing a Range Report; obtain a radio measurement request message comprising one or more fields requesting the Range Report; initiate transmission of a radio measurement response message comprising a Range Report; and obtain a probe response message following transmission of the radio measurement response messages, the probe response message being transmitted in response to the probe request message.

Another particular implementation is directed to a non-transitory storage medium comprising computer readable instructions stored thereon which are executable by a processor of a first wireless transceiver to: initiate transmission of a probe request message comprising a radio measurement capabilities element indicating a capability of providing a Range Report; obtain an ANQP query message comprising one or more fields requesting the Range Report; initiate transmission of an ANQP response message comprising a Range Report; and obtain a probe response message following transmission of the radio measurement response message, the probe response message being transmitted in response to the probe request message.

Another particular implementation is directed to a method at a first wireless station (STA) comprising: receiving a fine timing measurement (FTM) request message from a second STA, the FTM request message comprising one or more fields indicating a range report capability of the second STA. In one particular implementation, the method further comprises transmitting one or more FTM messages from the first STA responsive to the FTM request message. In another particular implementation, the method further comprises receiving an unsolicited radio measurement frame from the second STA comprising a range report based, at least in part, on the one or more FTM messages. Here, at least one of the one or more FTM messages may comprise one or more fields indicating a request for a Range Report. In another implementation, the method further comprises transmitting a plurality of FTM messages from the first STA via a burst of FTM messages; transmitting an access network query protocol (ANQP) request message, the ANQP request message being transmitted by the first STA prior to transmission of a last FTM message in the burst of FTM messages, the ANQP request message comprising one or more fields expressing a request for a Range Report; and transmitting an ANQP response message in response to the ANQP request message.

Another particular implementation is directed to a method, at a first wireless transceiver device, comprising: receiving a probe request message transmitted from a second wireless transceiver device comprising a radio measurement capabilities element indicating a capability of the second wireless transceiver device in providing a Range Report; transmitting a radio measurement request message comprising one or more fields requesting the Range Report; receiving a radio measurement response message comprising a Range Report; and transmitting a probe response message in response to receipt of the radio measurement response message.

Another particular implementation is directed to a method at a first wireless transceiver device, comprises: receiving a probe request message transmitted from a second wireless transceiver device comprising a radio measurement capabilities element indicating a capability of the second wireless transceiver device in providing a Range Report; transmitting an ANQP query message to the second wireless transceiver device comprising one or more fields requesting the Range Report; receiving an ANQP response message comprising the Range Report; and transmitting a probe response message in response to receipt of the ANQP response message.

Another particular implementation is directed to a first wireless station (STA), comprising: a wireless transceiver; and a processor coupled to the wireless transceiver to: obtain a fine timing measurement (FTM) request message received at the wireless transceiver from a second STA, the FTM request message comprising one or more fields indicating a capability of the first STA to generate Range Reports. In a particular implementation, the processor is further configured to: initiate transmission of one or more FTM messages through the wireless transceiver to the second STA responsive to the FTM request message. In another particular implementation, the processor is further configured to: obtain an unsolicited radio measurement frame received at the wireless transceiver from the second STA comprising a range report message based, at least in part, on the one or more FTM messages. Here, at least one of the one or more FTM messages may comprise one or more fields indicating a request for a Range Report. In another particular implementation, the processor is further configured to: initiate transmission of a plurality of FTM messages through the transceiver device to the second STA in a burst of FTM messages; initiate transmission of an ANQP request message through the wireless transceiver, the ANQP request message being transmitted prior to transmission of a last FTM message in the burst of FTM messages, the ANQP request message comprising one or more fields expressing a request for a Range Report; and obtain an ANQP response message received the wireless transceiver and transmitted in response to the ANQP request message.

Another particular implementation is directed to a first wireless transceiver device, comprising: a wireless transceiver; and a processor coupled to the wireless transceiver configured to: obtain a probe request message transmitted by the second wireless transceiver device and received at the wireless transceiver comprising a radio measurement capabilities element indicating a capability of the second wireless transceiver device in providing a Range Report; initiate transmission of a radio measurement request message through the wireless transceiver comprising one or more fields requesting the Range Report; obtain a radio measurement response message transmitted by the second wireless transceiver device and received at the wireless transceiver comprising a Range Report; and initiate transmission of a probe response message through the wireless transceiver in response to receipt of the radio measurement response message.

Another particular implementation is directed to a first wireless transceiver device, comprising: a wireless transceiver; and a processor coupled to the wireless transceiver and configured to: obtain a probe request message transmitted by a second wireless transceiver device and received at the wireless transceiver comprising a radio measurement capabilities element indicating a capability of the second wireless transceiver device in providing a Range Report; initiate transmission of an ANQP query message through the wireless transceiver comprising one or more fields requesting the Range Report; obtain an ANQP response message transmitted by the second wireless transceiver device and received at the wireless transceiver comprising a Range Report; and initiate transmission of a probe response message through the wireless transceiver following receipt of the radio measurement response message.

Another particular implementation is directed to a first wireless station (STA) comprising: means for receiving a fine timing measurement (FTM) request message from a second STA, the FTM request message comprising one or more fields indicating a capability of the second STA to generate Range Reports; and means for transmitting an acknowledgment message to the second STA in response to the FTM message. In a particular implementation, the first STA further comprises: means for transmitting one or more FTM messages to the second STA responsive to the FTM request message. Here, the first STA may further comprise means for receiving an unsolicited radio measurement frame from the second STA comprising a range report message based, at least in part, on the one or more FTM messages. Here, at least one of the one or more FTM messages comprises one or more fields indicating a request for a Range Report.

Another particular implementation is directed to a first STA comprising: means for transmitting a plurality of FTM messages to the second STA in a burst of FTM messages; means for transmitting an ANQP request message, the ANQP request message being transmitted by the first STA prior to transmission of a last FTM message in the burst of FTM messages, the ANQP request message comprising one or more fields expressing a request for a Range Report; and means for receiving an ANQP response message transmitted in response to the ANQP request message.

Another particular implementation is directed to a first wireless transceiver device, comprising: means for receiving a probe request message comprising a radio measurement capabilities element indicating a capability of a second wireless transceiver device in providing a Range Report; means for transmitting a radio measurement request message comprising one or more fields requesting the Range Report; means for receiving a radio measurement response message comprising a Range Report; and means for transmitting a probe response message in response to receipt of of the radio measurement response message, the probe response message being transmitted further in response to the probe request message.

Another particular implementation is directed to a first wireless transceiver device, comprising: means for receiving a probe request message transmitted by a second wireless transceiver device comprising a radio measurement capabilities element indicating a capability of the second wireless transceiver device in providing a Range Report; means for transmitting an ANQP query message comprising one or more fields requesting the Range Report; means for receiving an ANQP response message comprising the Range Report; and means for transmitting a probe response message following in response to receipt of the ANQP response message, the probe response message being transmitted further in response to the probe request message.

Another particular implementation is directed to a non-transitory storage medium comprising computer readable instructions stored thereon which are executable by a processor of initiating first wireless station (STA) to: obtain a fine timing measurement (FTM) request message received at the first wireless station from a second STA, the first FTM request message comprising one or more fields indicating a capability of the second STA to generate Range Reports. In a particular implementation, the instructions are further executable by the processor to: initiate transmission of one or more FTM messages to the second STA responsive to the FTM request message. In another implementation, the instructions are further executable by the processor to: obtain an unsolicited radio measurement received at the first STA and transmitted by the second STA comprising a range report message based, at least in part, on the one or more FTM messages. Here, at least one of the one or more FTM messages comprises one or more fields indicating a request for a Range Report. In another particular implementation, the instruction are further executable by the processor to: initiate transmission of a plurality of FTM messages to the second STA in a burst of FTM messages; initiate transmission of an ANQP request message, the ANQP request message being transmitted by the second STA prior to transmission of a last FTM message in the burst of FTM messages, the ANQP request message comprising one or more fields expressing a request for a Range Report; and obtain an ANQP response message received at the first STA and transmitted in response to the ANQP request message.

Another particular implementation is directed to a non-transitory storage medium comprising computer readable instructions stored thereon which are executable by a processor of a first wireless transceiver device to: obtain a probe request message transmitted by a second wireless transceiver device and received at the first wireless transceiver device comprising a radio measurement capabilities element indicating a capability of the second wireless transceiver device in providing a Range Report; initiate transmission of a radio measurement request message comprising one or more fields requesting the Range Report; obtain a radio measurement response message comprising a Range Report transmitted by the second wireless transceiver device and received at the first wireless transceiver device; and initiate transmission of a probe response message in response to receipt of the radio measurement response message, the probe response message being transmitted further in response to the probe request message.

Another particular implementation is directed to a non-transitory storage medium comprising computer readable instructions stored thereon which are executable by a processor of a first wireless transceiver device to: obtain a probe request message transmitted by a second wireless transceiver device and received at the first wireless transceiver comprising a radio measurement capabilities element indicating a capability of providing a Range Report; initiate transmission of an ANQP query message comprising one or more fields requesting the Range Report; obtain an ANQP response message received at the first wireless transceiver device comprising a Range Report; and initiate transmission of a probe response message in response to receipt of the ANQP response message, the probe response message being transmitted further in response to the probe request message.

It should be understood that the aforementioned implementations are merely example implementations, and that claimed subject matter is not necessarily limited to any particular aspect of these example implementations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIGS. 7 through 9 are diagrams illustrating fields of an FTM request message transmitted from an initiating wireless transceiver device according to particular embodiments;

FIG. 10 is a message flow diagram in which a request for a Range Report is transmitted in an ANQP query request message according to an embodiment;

FIGS. 11 and 12 are diagrams illustrating fields of an ANQP query request message and an ANQP response message according to an embodiment;

FIG. 13 is a message flow diagram in which a capability for providing a Range Report is expressed in a Radio Measurement probe request message according to an embodiment;

FIG. 14 is a diagram illustrating fields of a Radio Measurement probe request message according to an embodiment;

Figure 1:
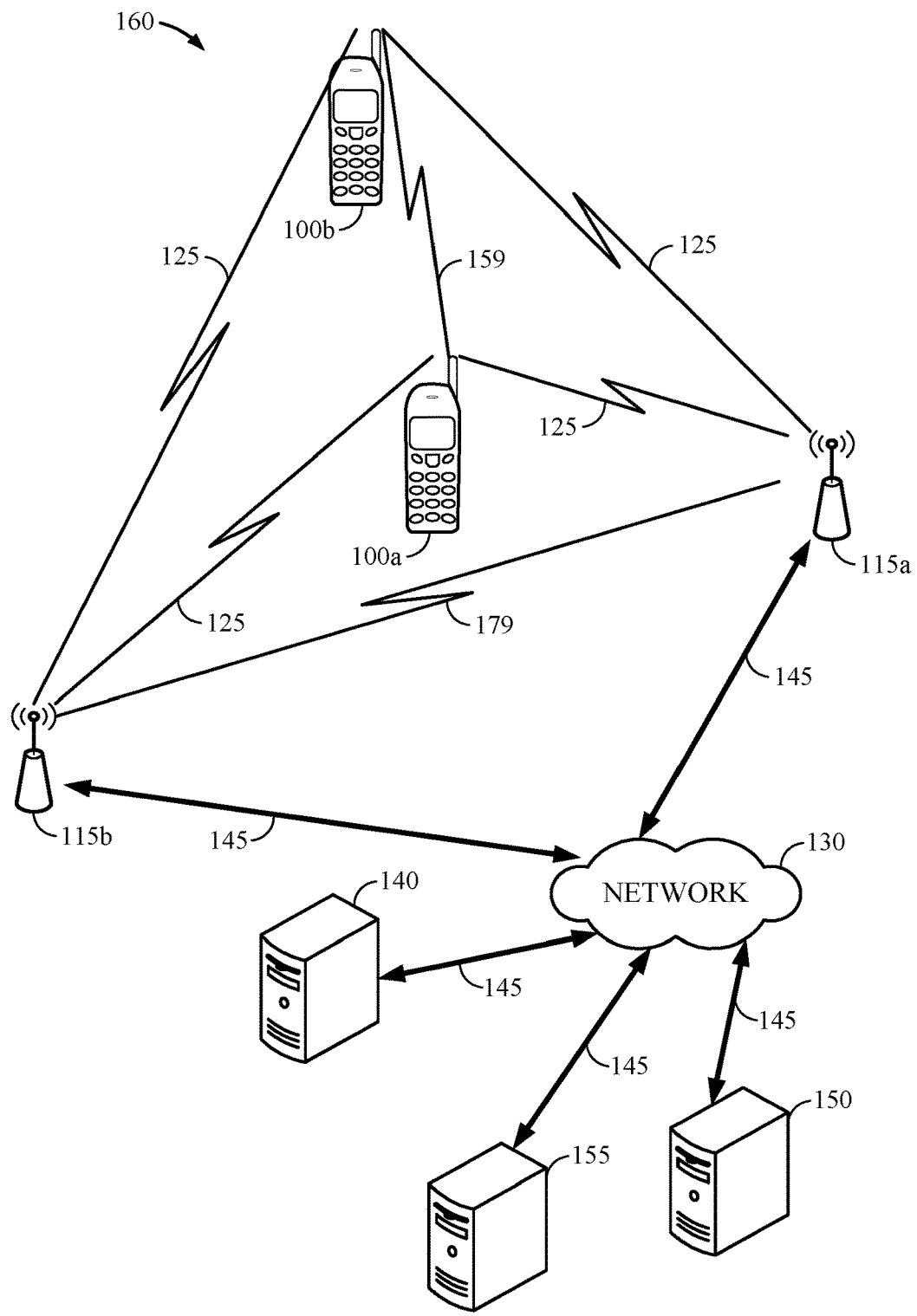
FIG. 1 is a system diagram illustrating certain features of a system containing a mobile device, in accordance with an implementation.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As discussed below, particular message flows may enable effective and efficient measurements of a range in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining round-trip time (RTT) or time of flight (TOF) measurements with sufficient accuracy for measuring a range between the wireless STAs using fewer messages, for example. Such a measured range may be used in any one of several applications including positioning operations, for example.

As discussed below, a first STA may transmit a fine timing measurement request message to a second STA to initiate a process for an exchange of messages or frames enabling the first STA to obtain an RTT or TOF measurement. In a particular implementation, the fine timing measurement request message may include an indication as to whether the first STA is capable of sharing ranging measurements or other parameters indicative of range. In a particular implementation, subsequent to computation of an RTT or TOF measurement, the first STA may transmit one or more messages to the second STA comprising a computed range, TOF or RTT measurement or other parameter indicative of range. It should be understood that this is merely an example implementation and that claimed subject matter is not limited in this respect.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a TOF for the transmission of a message between STAs using fewer messages than typical techniques used for measuring RTT. According to an embodiment, TOF may be measured for individual messages in a "burst" of messages transmitted close in a sequence. Combining multiple TOF measurements from a burst of received messages may enable reduction in measurement errors, for example.

According to an embodiment, parameters indicative of a range between STAs based on an exchange of messages between the STAs may be shared in one or more messages comprising a Range Report. Embodiments described herein are directed to, among other things, simplifying protocols for sharing parameters indicative of range in Range Reports transmitted between STAs.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprise TOF, AoA, SI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100a and 100b over wireless link 159), or between two stationary transceivers (e.g., between local transceiver 115a and local transceiver 115b over wireless link 179), just to provide a few examples. In particular implementations, various techniques described herein may incorporate some, but not necessarily all, aspects or features of IEEE P802.11-REVmc™/D6.0 Draft Standard 802.11 for Information technology—Telecommunications and information exchange between systems, Local and metropolitan area networks—Specific requirements Part 11: Wireless LAN Medium Access Control (MAC) and Physical Layer (PHY), June 2016 (hereinafter "IEEE std. 802.11 specification"). Indeed, it should be understood that some features described herein are not shown, described or taught in the IEEE std. 802.11.

Figure 2:
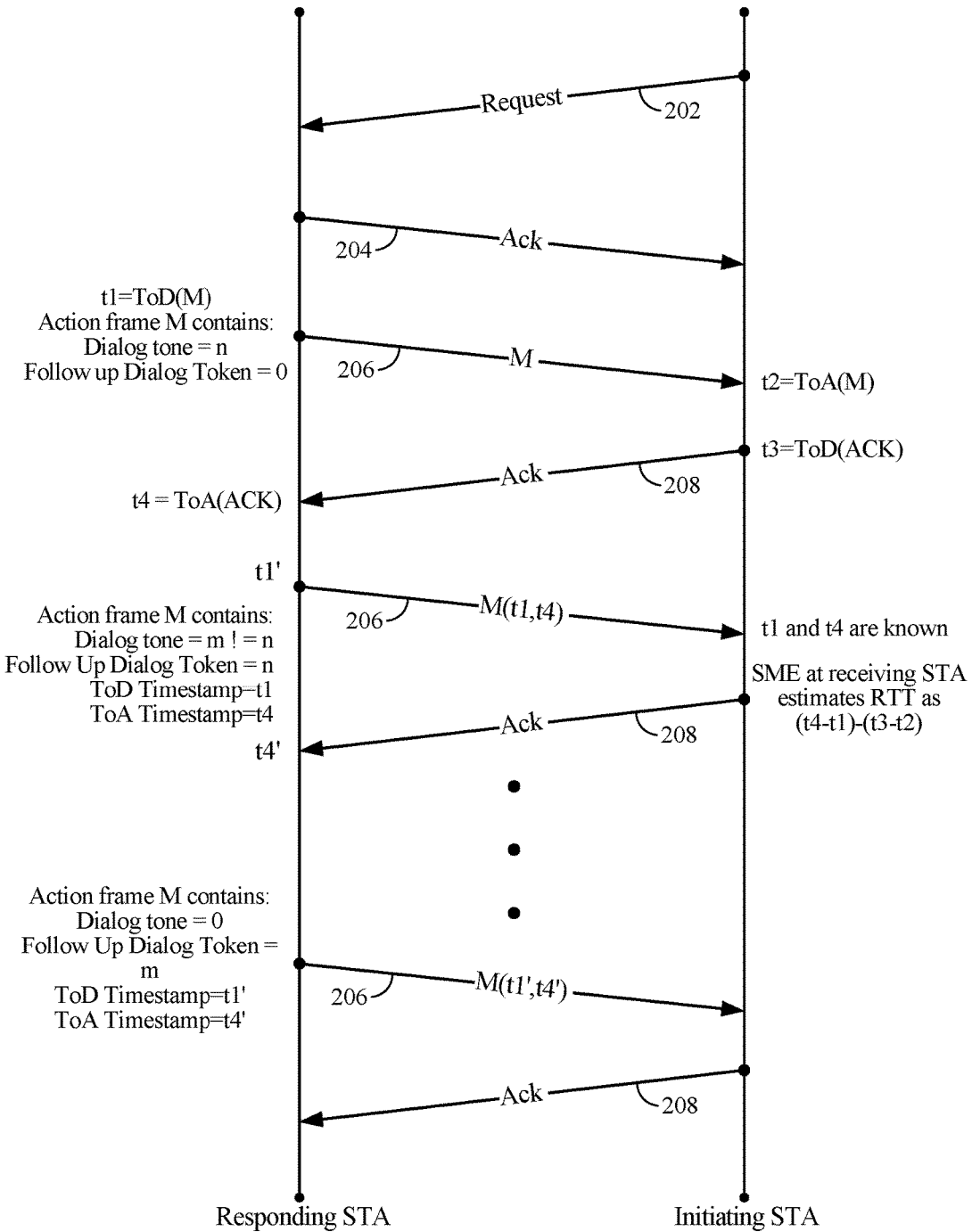
FIGS. 2 and 3 are message flow diagrams according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2, t3 and t4).

In this context, an "FTM message" as referred to herein means a message transmitted from a first device to a second device comprising at least one field having a precise indication of a time of transmission from the first device. As discussed above, such a field indicating at time of transmission of the FTM message may permit the recipient second device to compute one or more parameters indicative of a range between the first and second devices. An FTM message transmitted by the first device may be initiated by receipt of an FTM request message transmitted by the second device. In this context, an "FTM request message" as referred to herein means a message transmitted to the first device requesting transmission of one or more FTM messages to the second device.

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more FTM messages including measurements or parameters enabling the initiating STA to compute RTT or other parameters indicative of range.

In a particular implementation, while not limiting claimed subject matter in this respect, contents of such a fine timing measurement message or frame may be as shown in the IEEE std. 802.11. In one example implementation, an initiating STA may compute an RTT measurement as (t4−t1)− (t3−t2), where t2 and t3 are the time of receipt of a previous fine timing measurement message or frame and transmission of a preceding acknowledgement message or frame, respectively. The initiating STA may transmit a series of fine timing measurement request messages in a burst to obtain a corresponding number of RTT measurements which may be combined for cancellation of unbiased measurement noise in computing a range between the receiving and responding STAs.

FTM request messages and FTM messages may be transmitted by STAs in addition to frames or messages for other services (e.g., for Internet Protocol messaging). In dense wireless traffic scenarios such as airport terminals or stadium events, transmission of FTM request messages and FTM messages for the computation of RTT may stress available messaging capacity at a STA. Particular implementations discussed herein may be directed to an exchange of messages for obtaining measurements for computation of range between STAs using the transmission of fewer messages by a STA.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF=RTT/2 based on a different between the time stamp value and an instance that the particular symbol is decoded or detected.

Figure 3:
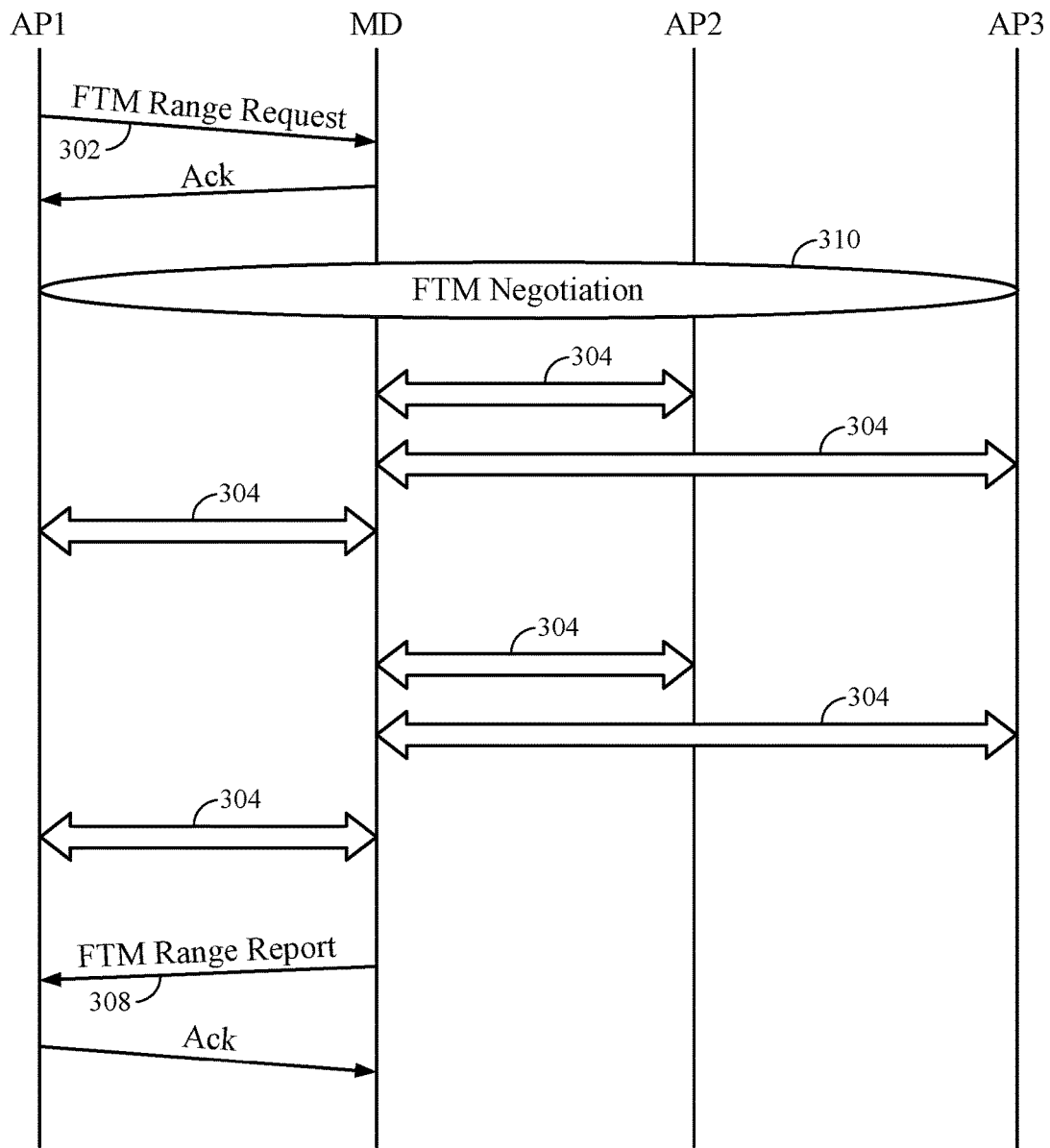

In particular network-centric positioning (NCP) techniques, an access point (AP) may request that a mobile device obtain measurements that may be used to compute a location of the mobile device. For example, an AP may transmit an FTM range request message to a mobile device to request that the mobile device obtain measurements based on messages exchanged with multiple devices (e.g., messages exchanged with the AP and other APs in operating in an area) as set forth in IEEE std. 802.11, for example. As illustrated in FIG. 3, an access point AP1 transmits an FTM range request message 302 to a mobile device MD. In a particular implementation, FTM range report message 302 may be transmitted according to IEEE std. 802.11. Mobile device MD may then have one or more message exchanges 304 (e.g., FTM request messages and FTM messages) with access point AP1, access point AP2 and access point AP3 to obtain measurements such as, for example RTT or TOA, just to provide a couple of examples. Mobile device MD may then transmit an FTM range report message 308 including, for example, parameters indicative of ranges to access points AP1, AP2 or AP3, or any combination thereof (e.g., measured ranges, RTT measurements, TOA measurements or other measurements indicative of range) as set forth in IEEE std. 802.11.

In this context, mobile device MD provides a specific example of an "observing wireless transceiver device" in that mobile device MD comprises a wireless transceiver device that is capable of obtaining observations (e.g., messages, signals, etc.) that are indicative of a range to at least one other neighboring wireless transceiver device. It should be understood, however, that mobile device MD is merely an example of an observing wireless transceiver device, and that other types of wireless transceiver devices (e.g., stationary access points) may be used without deviating from claimed subject matter. Also, access point AP1 may provide a specific example of an "assisting wireless transceiver device" in that access point AP1 comprises a wireless transceiver device that is capable of transmitting messages to an observing wireless transceiver device comprising providing parameters, values, etc. that may be used by the observing wireless transceiver device in obtaining observations of neighboring wireless transceiver devices. It should be understood, however, that access point AP1 is merely an example of an assisting wireless transceiver device, and that other types of wireless transceiver devices (e.g., mobile devices) may be used without deviating from claimed subject matter.

According to an embodiment, FTM Range Request message 302 may provide parameters that may be used by mobile device MD in initiating or participating in one or more exchanges of messages 304 with neighboring wireless transceiver devices such as access points AP1, AP2 and AP3. Such an exchange of messages 304 may enable mobile device MD to obtain one or more measurements or observations indicative of ranges between mobile device MD and neighboring wireless transceiver devices such as, for example, measurements of RTT, TOF or range. In one example implementation, an exchange of messages 304 between mobile device MD and a neighboring wireless transceiver device may be executed as mobile device MD acting as an initiating STA and the neighboring wireless transceiver device acting as a responding STA as discussed above. In an alternative implementation, an exchange of messages 304 between mobile device MD and a neighboring wireless transceiver device may be executed as mobile device MD acting as a responding STA and the neighboring wireless transceiver device acting as an initiating STA as discussed above. In an example embodiment, a negotiation 310 between mobile device MD and neighboring wireless transceiver device may enable determination of roles as initiating STA and responding STA for subsequent exchanges of messages 304. Here, in this particular example implementation, mobile device MD may act as an initiating while access points AP1, AP2 and AP3 may perform as responding STAs with respect to mobile device MD.

In the particular implementation of FIG. 3, an FTM range request message from access point AP1 acting as an assisting wireless transceiver device may indicate particular neighboring wireless transceiver devices (e.g., AP2 and AP3) with which mobile device MD may exchange messages for obtaining observations or measurements. For example, AP1 may transmit one or more Neighbor Report messages to an observing wireless transceiver device comprising parameters characterizing one or more neighboring wireless transceiver devices.

FIG. 3 is directed to a particular embodiment in which an FTM Range Report message 308 is provided to an AP1 in response to an FTM Range Request message 302. In some implementations, AP1 may determine that mobile device MD is capable of providing an FTM Range Report in the course of a process to "associate" mobile device MD with a network (e.g., authentication procedure performed as mobile device MD enters a venue) following an exchange of messages. An FTM range report may provide a means for an initiating STA to request a responding STA that advertises FTM Range Report capability to measure and report the ranges between the responding STA and other nearby devices where the ranges are determined using the FTM procedures discussed above.

In an embodiment, an initiating STA may obtain an ability to request an FTM Range Report capability when it receives a message from the responding STA indicating its ability to provide the FTM Range Report in a Radio Measurement (RM) Enabled Capabilities element of a message. Such an RM Enabled Capabilities element may be present in beacons, probe responses, association request, association response, reassociation request and reassociation response, just to name a few examples. As such, a requesting STA may request a STA for the FTM Range report if the STA has advertised its support by means of an association process. Here, the ability for a particular STA to request the FTM Range request is typically limited to its association with STAs.

It is often desired by a responding STA participating in an FTM procedure to obtain the ranges of an initiating STA with the latter's nearby APs and with itself. However, if the initiating STA is not associated with the AP (FTM responder), that AP may not be able to obtain the FTM Range report. Particular implementations described below are directed to techniques for enabling a responding STA to obtain an FTM Range Report from the initiating STA that does not require association of the initiating STA with the responding STA as a precondition.

Figure 4:
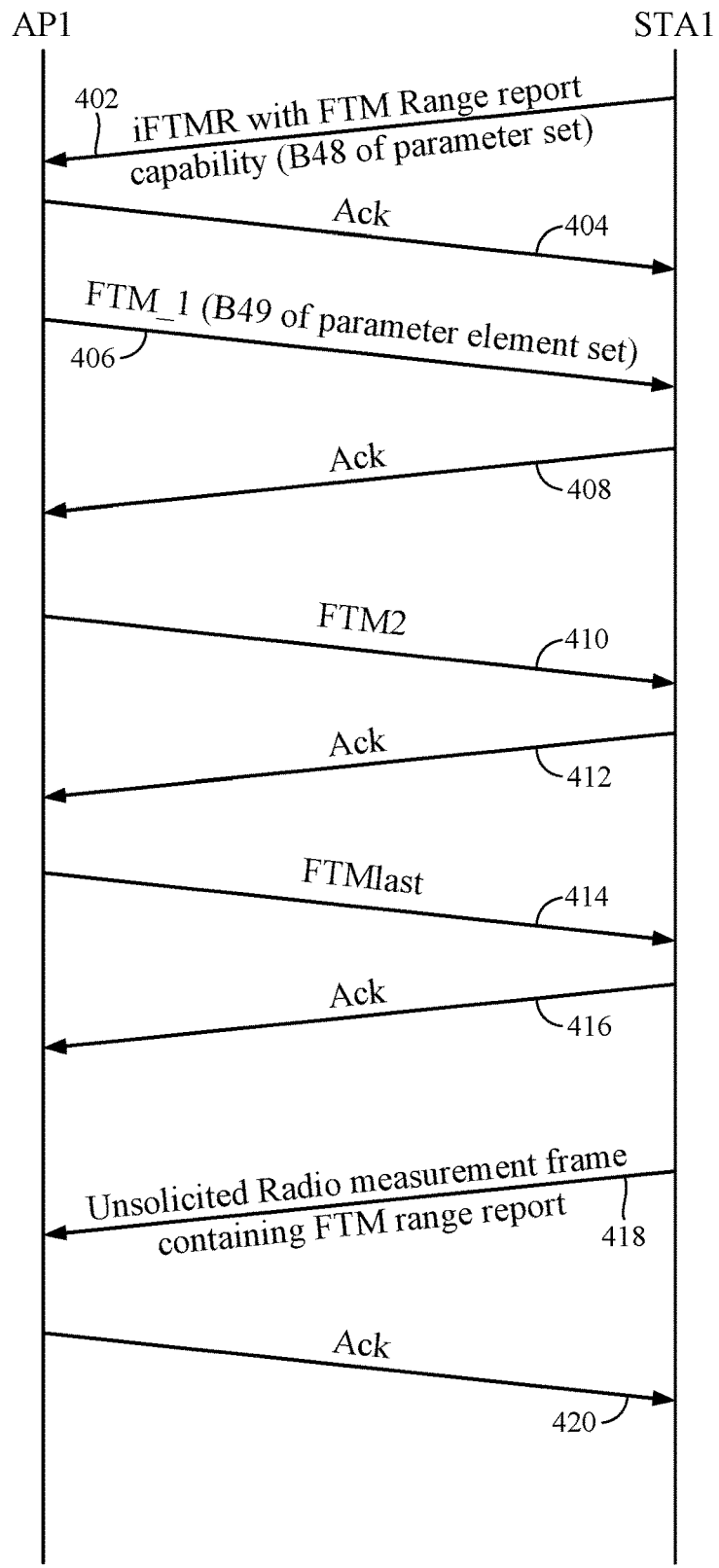
FIGS. 4 and 5 are message flow diagrams according to alternative implementations in which a capability for providing a Range Report is expressed in a fine timing measurement (FTM) request message.
Figure 5:
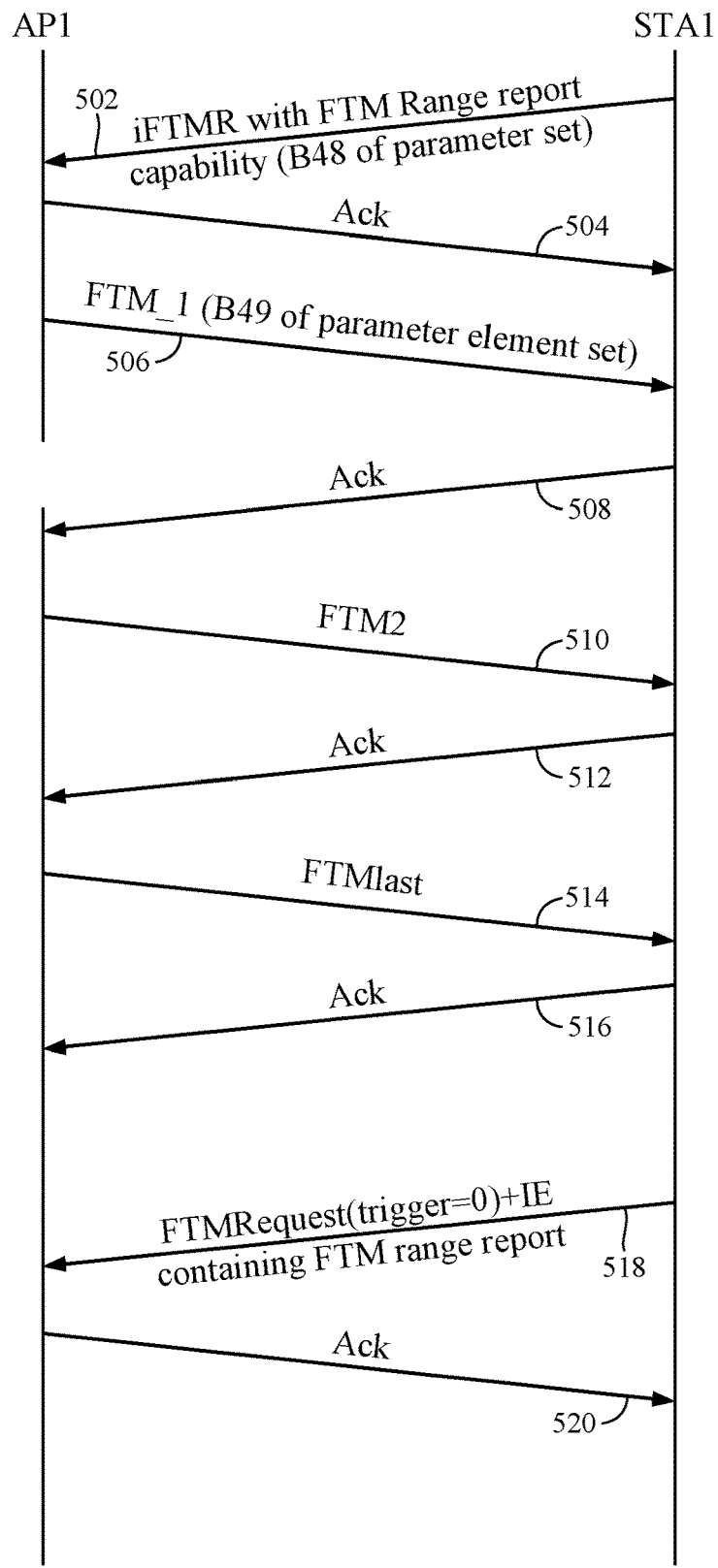

FIGS. 4 and 5 are message flow diagrams according to alternative implementations in which a capability for providing a Range Report is expressed in a fine timing measurement (FTM) request message. In this particular implementation, a first wireless transceiver device may determine that a second wireless transceiver device is capable of providing an FTM Range Report even if the first and second wireless transceiver devices have not been "associated" in an association procedure. In an embodiment, such an association procedure may comprise process to authenticate one or more devices and establish a level of communication between two devices through an exchange of management frames of messages. One advantage of some embodiments described herein is that a Range Report may be transmitted between devices that have not been associated by, for example, an exchange of particular management frames.

In FIG. 4, an initiation STA STA1 transmits an initial FTM request message iFTMR 402 to responding STA AP1 including one or more fields indicating that STA1 is capable of providing an FTM Range Report. In this particular implementation, STA STA1 and STA AP1 need not be associated in advance. Here, FTM request message iFTMR 402 may comprise a particular field such as a reserved bit B48 in the example of fields in an FTM request message shown in FIG. 6. In response to FTM request message iFTMR 492, STA AP1 may transmit an FTM message FTM_1 406 (e.g., as part of a burst of FTM messages responsive to FTM request message iFTMR) to express a request for a Range Report. For example, FTM message FTM_1 406 may comprise a particular field such as a reserved bit B49 in the example of fields in an FTM request message shown in FIG. 7. Responsive to a request for a Range Report in FTM message FTM_1 406 (e.g., in field bit B49), following receipt of a last or final FTM message FTMlast 414 (e.g., in a burst of FTM messages transmitted in response to FTM request message iFTMR), STA STA1 may transmit a subsequent unsolicited radio measurement frame 418 containing an FTM Range Report. Alternatively, as shown in FIG. 5, responsive to the request for a Range Report in FTM message FTM_1 506, following receipt of a last or final FTM message FTMlast 514, STA STA1 may transmit a subsequent FTM request message FTMRequest 518 comprising a Range Report (e.g., including values based on measurements obtained from FTM messages in the burst). FTM request message FTMRequest 518 may indicate that a Range Report is included by setting a value of a "Trigger" field to "0" as shown in FIG. 8 and an optional subelement including range measurement parameters as shown in FIG. 9.

Figure 6A:
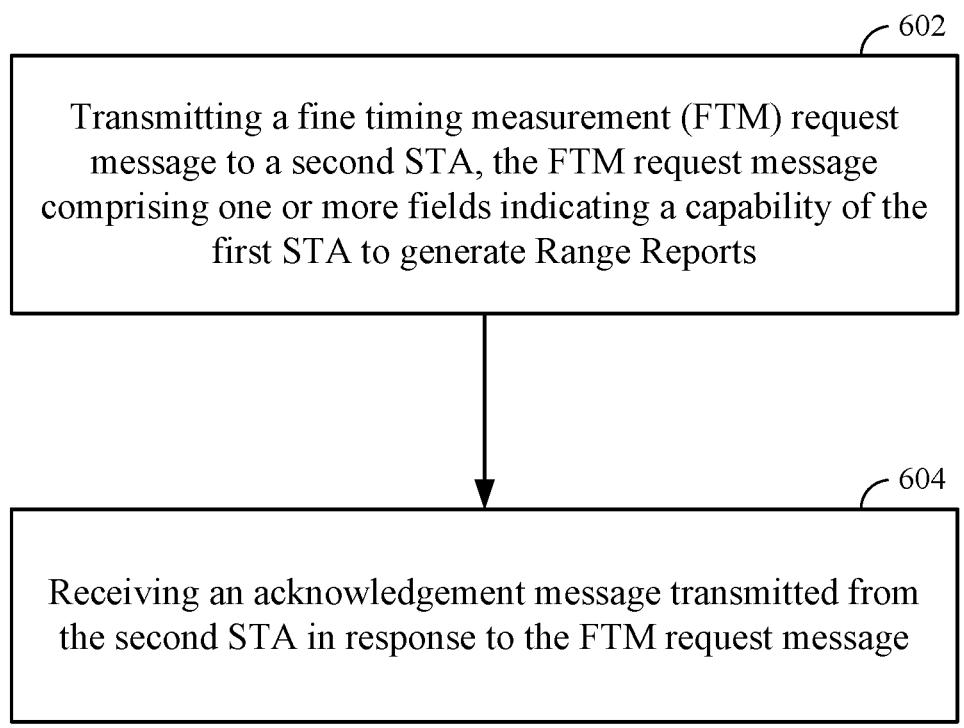
FIGS. 6A and 6B are flow diagrams of processes to facilitate transmission of Range Reports between devices according to an embodiment.
Figure 6B:
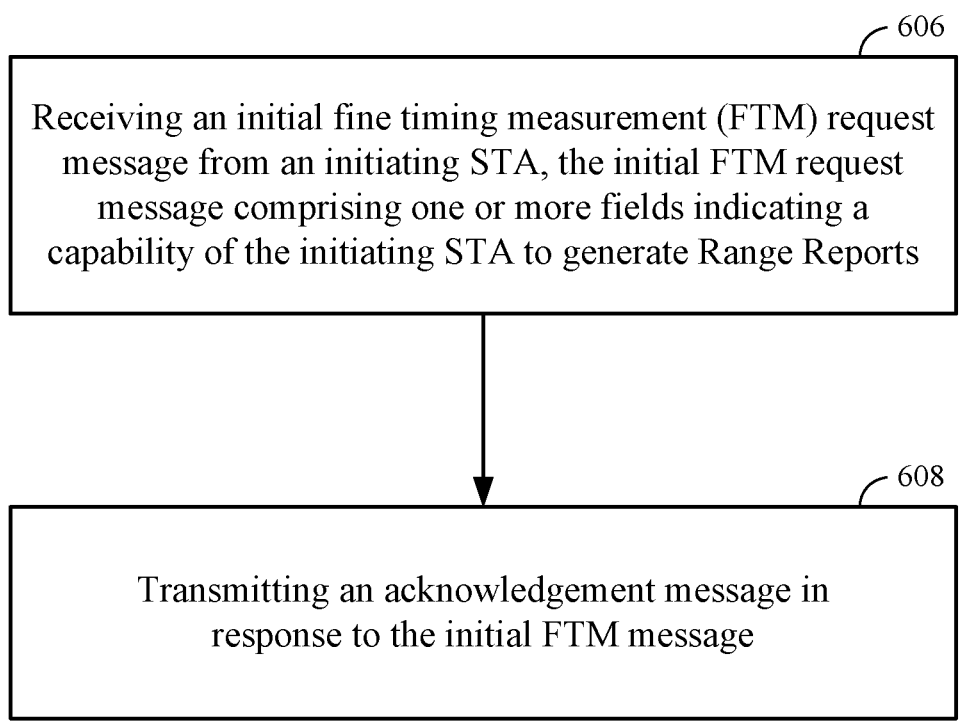

FIGS. 6A and 6B are flow diagrams of processes to facilitate transmission of Range Reports according to an embodiment. At block 602, an initiating STA may transmit an initial FTM request message (e.g., iFTMR message 402 or 502) comprising one or more fields indicating a capability of the initiating STA to generate Range Reports. At block 606, a responding STA may receive the initial FTM request message transmitted at block 602 and transmit an acknowledgement message (e.g., acknowledgement message 404 or 504) in response to the initial FTM request message. The acknowledgement message may be received at block 604.

In this context, a "Range Report" as referred to herein means a representation of one or more parameters indicative of a range between two devices in a particular format, such as a signal format. In one particular embodiment, parameters indicative of a range in a Range Report may be computed or determined based, at least in part, on an exchange of messages between two devices and may include, for example, one or more numerical values indicative of a RTT, TOF, timing parameters or distance, just to provide a few examples of parameters indicative of range. Furthermore, in particular implementations, a Range Report may be transmitted in fields of one or more messages transmitted between devices. It should be understood, however, that these are merely examples of a Range Report and that claimed subject matter is not limited in this respect. A "capability to generate Range Reports" as referred to herein means an ability of a device to determine parameters of a Range Report (e.g., parameters indicative of range) and to represent the determined parameters in a particular electronic format such as a wireless message transmitted to another device.

Figures 10, 11:
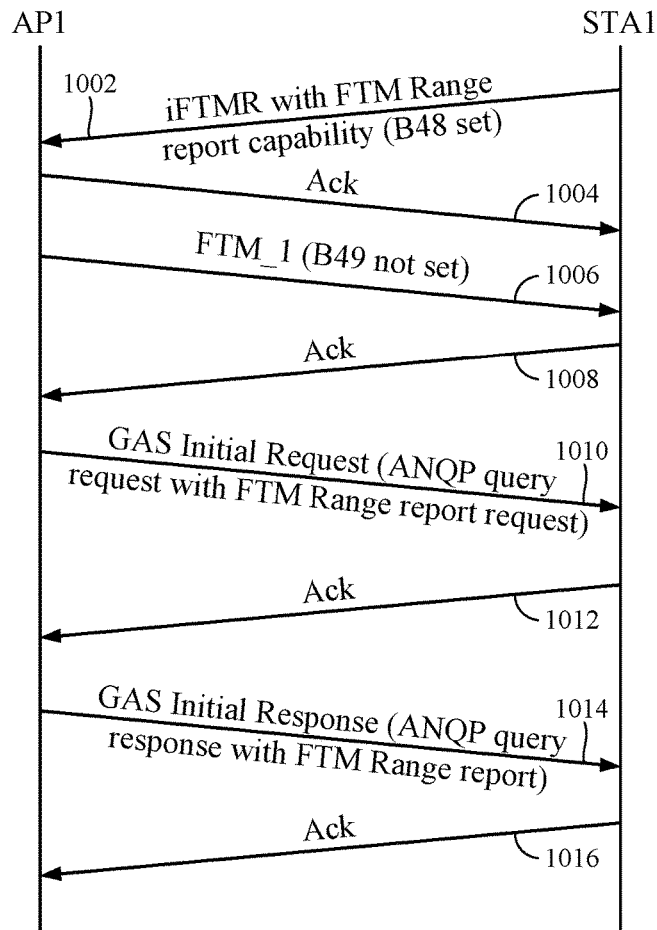

FIG. 10 is a message flow diagram in which a request for an FTM range report is transmitted in an ANQP query request message according to an embodiment. In this particular implementation, STA STA1 transmits an initial FTM request message 1002 including a value in field B48 indicating that STA STA1 is capable of providing an FTM Range Report. However, FTM message FTM_1 1006 from STA AP1 does not indicate any request for an FTM range report in field B49. Instead, STA AP1 may transmit an Access Network Query Protocol (ANQP) query request message under IEEE std. 802.11u indicating request for an FTM range report. Example uses of an ANQP query and ANQP Query response may be found in the IEEE std. 802.11 specification. For example, the ANQP query request message may indicate a request for an FTM range report in Measurement Request field (e.g., ID=38, Measurement Type=16). STA STA1 may in response to the ANQP query request message transmit an ANQP query response message comprising an FTM range report. For example, the ANQP query response message may include an FTM range report using GAS frame 1014 indicating an unused value for InfoID as shown in FIG. 12. FTM request message iFTMR 1002 may include a request for a burst of FTM messages to be transmitted from STA AP1 to STA STA1. In a particular implementation, the ANQP query request message in Generic Advertisement Service (GAS) frame 1010 and the ANQP query response message in GAS frame 1014 may be transmitted while a burst of FTM messages is in process (e.g., as requested at FTM request message iFTMR 1002) and before the burst is completed. In this context, a GAS frame may provide for Layer 2 transport of an advertisement protocol's frames between devices in a network prior to authentication (e.g., for associating the two devices).

In an alternative implementation as shown in FIG. 13, a first STA STA1 may indicate its capability to provide an FTM range report to a second STA AP in one or more fields of a Radio Measurement probe request message 1310 in an extension to a RM Enabled Capabilities field shown in FIG. 14. Here, the second STA AP may transmit a Radio Measurement request message 1306 including a request for an FTM Range Report. Responsive to Radio Measurement request message 1306. On receiving Radio Measurement response message 1310 responsive to the Radio Measurement request message 1306, STA AP may transmit a Radio Measurement Probe Response message 1314. By STA AP suspending transmission of the Radio Measurement Probe Response message 1314 until receipt of the Radio Measurement response message 1310 containing the requested FTM Range Report, STA STA1 may maintain its wireless transceiver on the same channel until completion of the exchange of messages to provide the requested FTM Range Report to STA AP in Radio Measurement response message 1310.

Figure 15A:
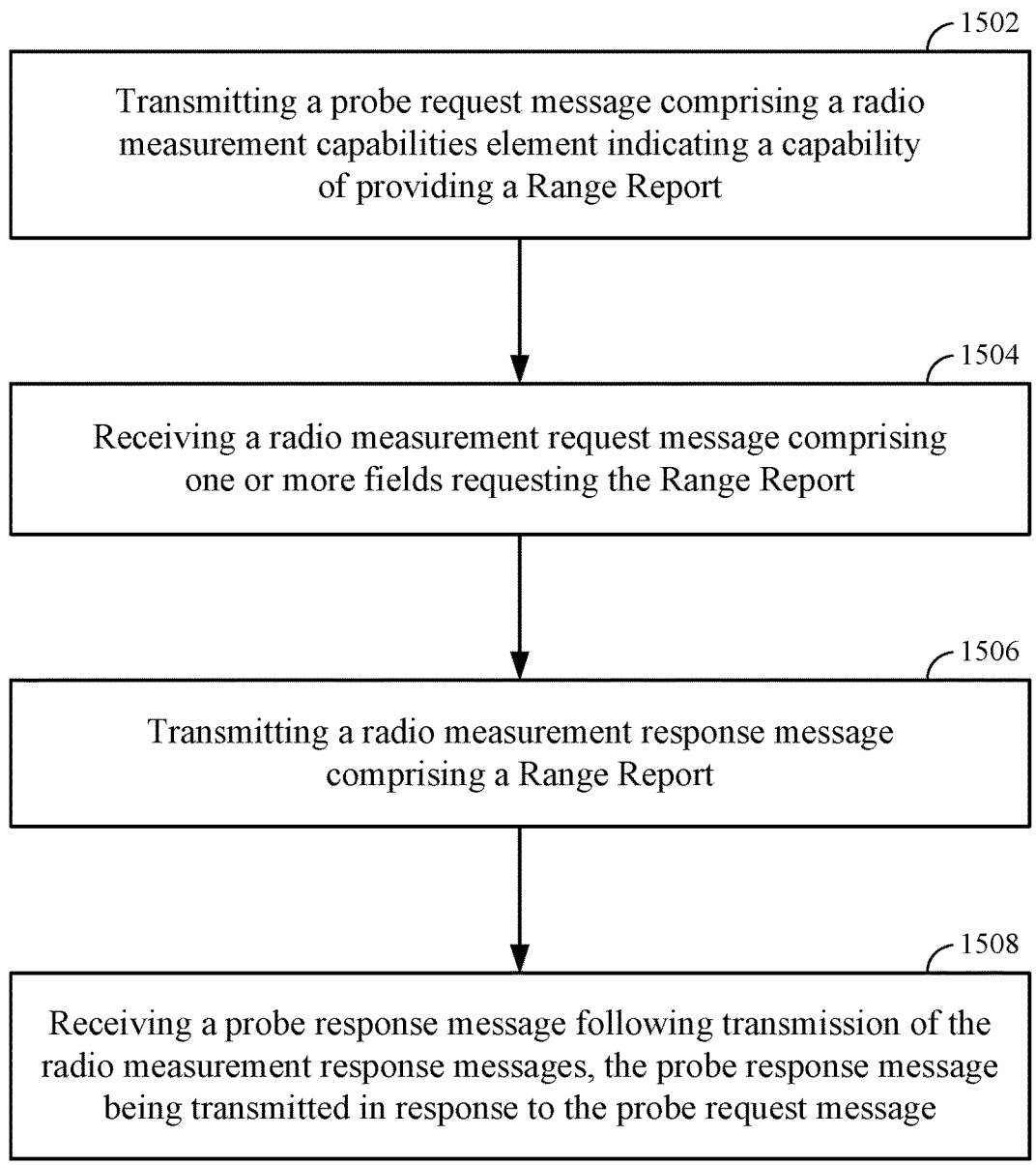
FIGS. 15A and 15B are flow diagrams of processes for transmitting a Range Report in messages according to an embodiment.
Figure 15B:
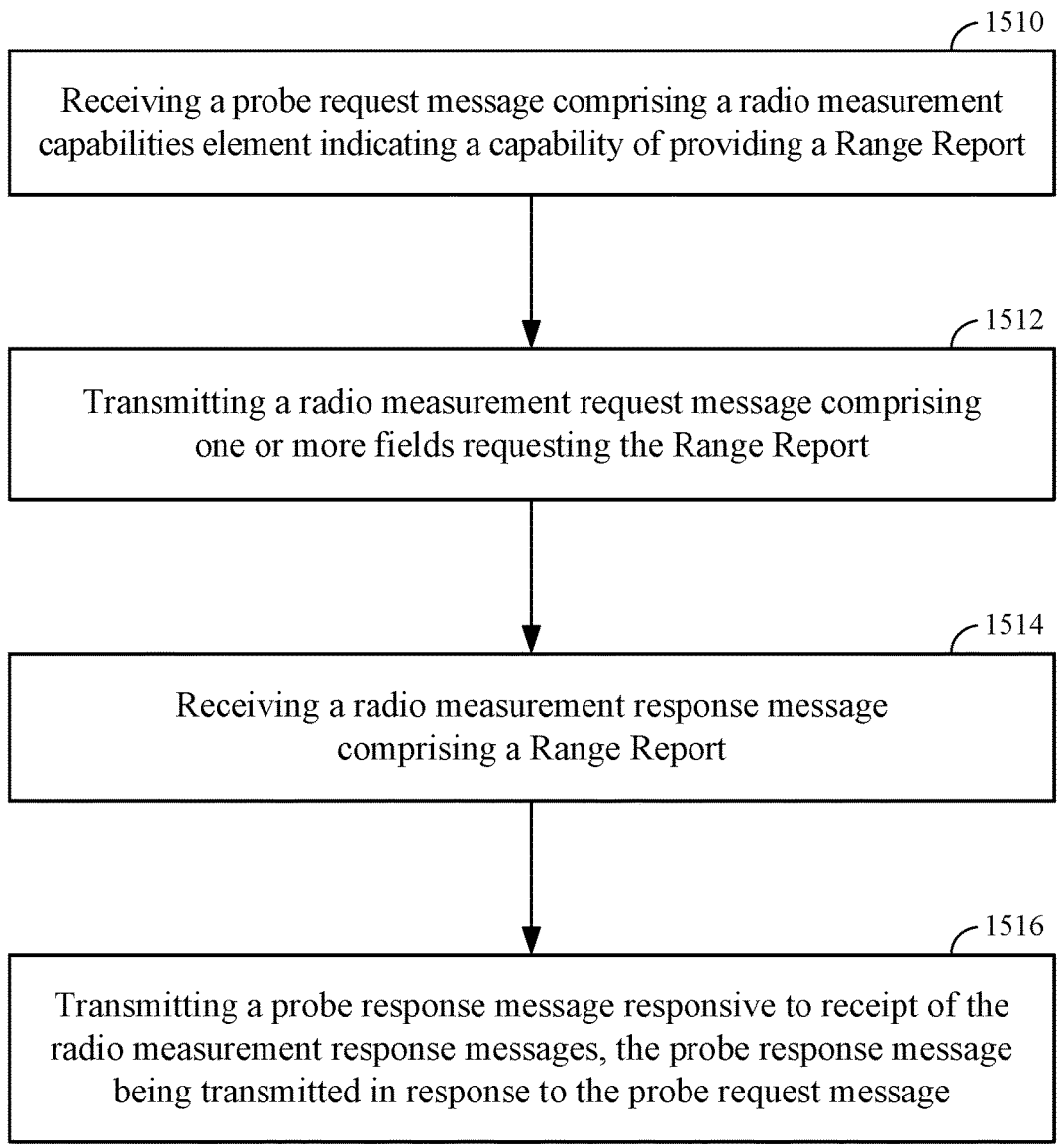

FIGS. 15A and 15B are flow diagrams of processes to provide share a Range Report between devices according to an embodiment. Here, the actions of FIG. 15A may be performed by a first STA and the actions of FIG. 15B may be performed by a second STA to provide a Range Report to the second STA. Block 1502 may comprise transmitting a probe request message (e.g., probe request message 1302) comprising a radio measurement capabilities element indicating a capability of providing a Range Report. In this context, a radio measurement capabilities element comprises one or more symbols indicating a capability to provide one or more different types of radio measurements. In one implementation, the probe request message may comprise a field resembling features of a Radio Measurement request element corresponding to an FTM range report. In this context, a "probe request message" as referred to herein means a message that is formatted to inquire as to an availability of a network resource on a particular wireless transmission channel. In one implementation, a probe request message may be transmitted as a beacon signal to a broadcast address (e.g., ff:ff:ff:ff:ff:ff). A device transmitting a probe request message may wait a particular duration of time to receive a probe response message transmitted in response to the probe request message. In the absence of receipt of a probe response message transmitted on a first channel on expiration of the duration of time, the device may transmit a subsequent probe request message on a second channel. In an example implementation, a probe request message and a probe response messages may be implemented as part of an active scanning procedure. In this context, a "probe response message" as referred to herein means a message indicating an availability of a network resource transmitted in response to a probe request message. For example, a probe response message transmitted in response to a probe request message may indicate an availability of a particular channel on which probe request message is transmitted.

The probe request message including a radio measurement capabilities element transmitted at block 1502 may be received at block 1510. In this context, a "radio measurement capabilities element" as referred to herein means a particular field or portion of a field in a message defined according to a communication format to indicate a capability or availability to provide one or more types of radio measurements. Block 1512 may comprise transmitting a radio measurement request message (e.g., radio measurement request message 1306) comprising one or more fields requesting a range report, which may be received at block 1504. Block 1506 may transmit a radio measurement response message (e.g., radio measurement response message 1301) comprising the Range Report requested in the message received at block 1504. The radio measurement response message transmitted at block 1506 may be received at block 1514. Block 1516 transmits a probe response message (e.g., probe response message 1314) responsive to receipt of the radio measurement response message at block 1514. The probe response message transmitted at block 1516 may be received at block 1508. As pointed out above, transmitting the probe response message at block 1516 responsive to receipt of the radio measurement response message at block 1514 enables suspending transmission of the Radio Measurement Probe Response message, which allows wireless stations to maintain a wireless transceiver on the same channel until completion of the exchange of messages to provide the requested FTM Range Report.

Figure 16:
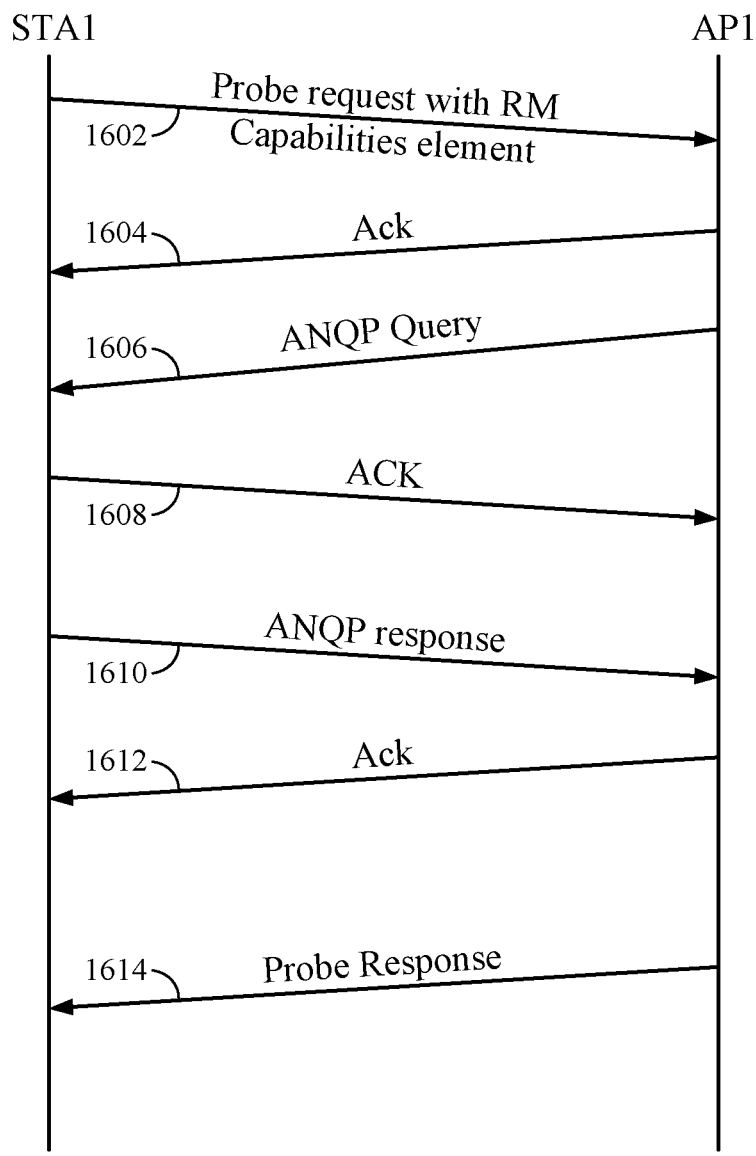
FIG. 16 is a message flow diagram for transmitting a Range Report in response to an ANQP request according to an embodiment.

In an alternative to the embodiment shown in another embodiment shown in FIG. 13, FIG. 16 shows a particular implementation in which STA AP includes a request for an FTM Range Report in an ANQP query message. STA STA1 may then respond with an ANQP response message containing the requested FTM Range Report message.

Figure 17A:
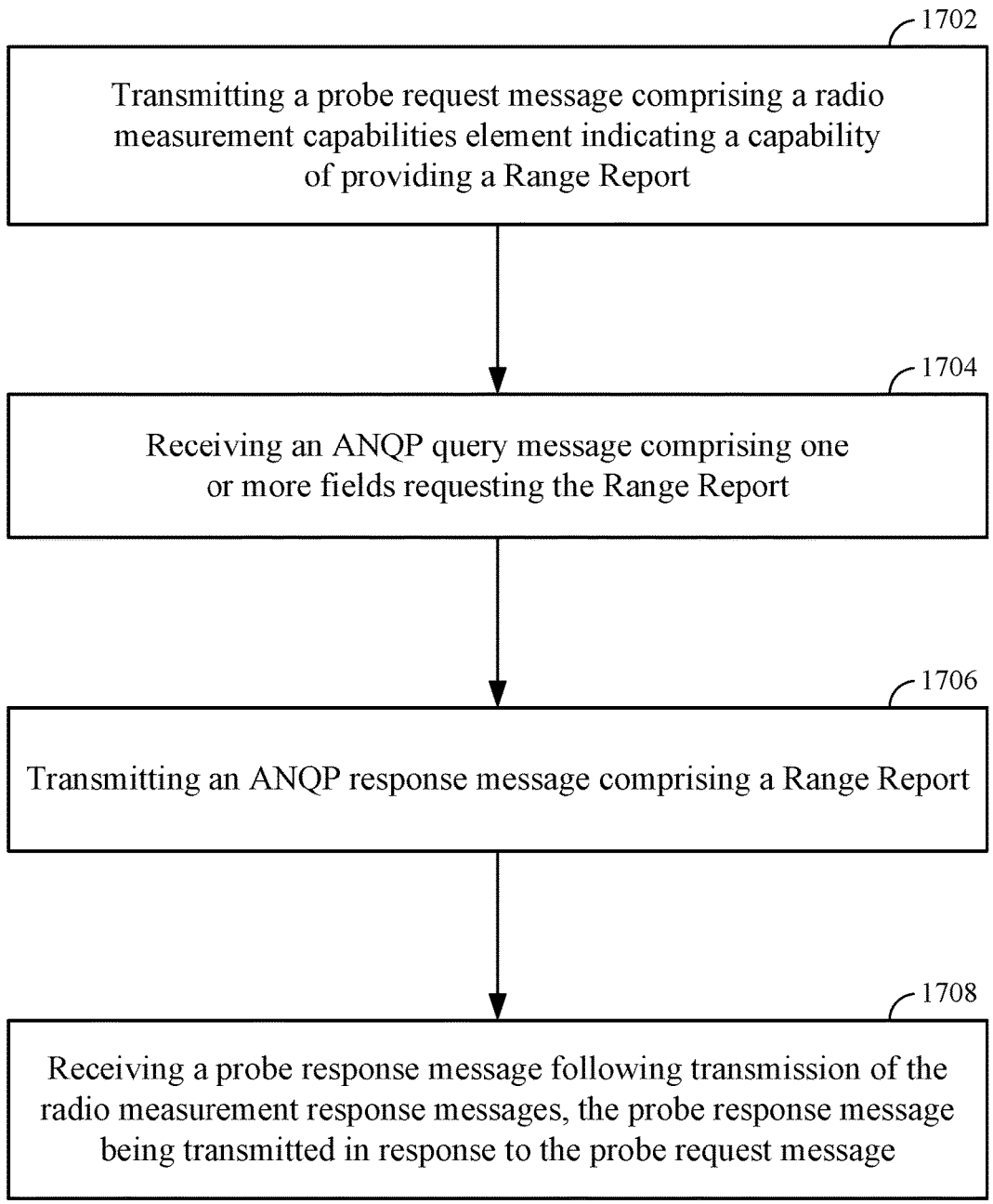
FIGS. 17A and 17B are flow diagrams of processes for transmitting a Range Report in messages according to an embodiment.
Figure 17B:
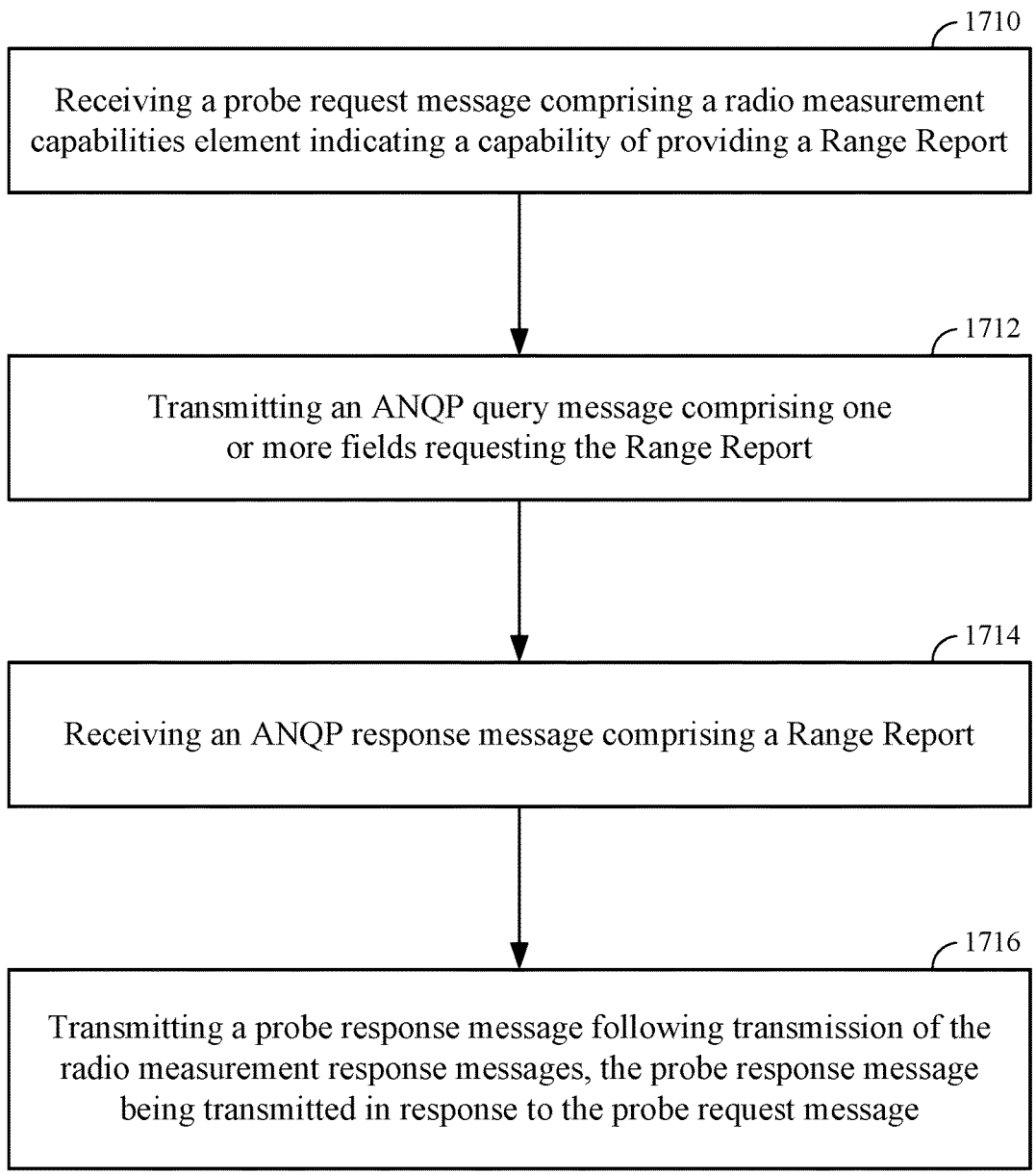

FIGS. 17A and 17B are flow diagrams of processes to provide share a Range Report between devices according to an alternative embodiment. The processes of FIGS. 17A and 17B differ in that a Range Report is requested in an Access Network Query Protocol (ANQP) query message (e.g., ANQP query message 1606) at block 1712 and that a Range Report is provided at block 1716 in an ANQP response message (e.g., ANQP response message 1610). In this context, an "ANQP query message" as referred to herein means a message transmitted by a first device to a second inquiring as to an availability of wireless network access resources through the second device. An "ANQP response message" as referred to herein means a message transmitted by a device in response to receipt of an ANQP request message indicating an availability of wireless network access resources through the device. In one example implementation, an ANQP request message and an ANQP response message transmitted in response to the ANQP request message may be exchanged between devices prior to the devices being an associated state (e.g., through an association procedure).

Figure 18:
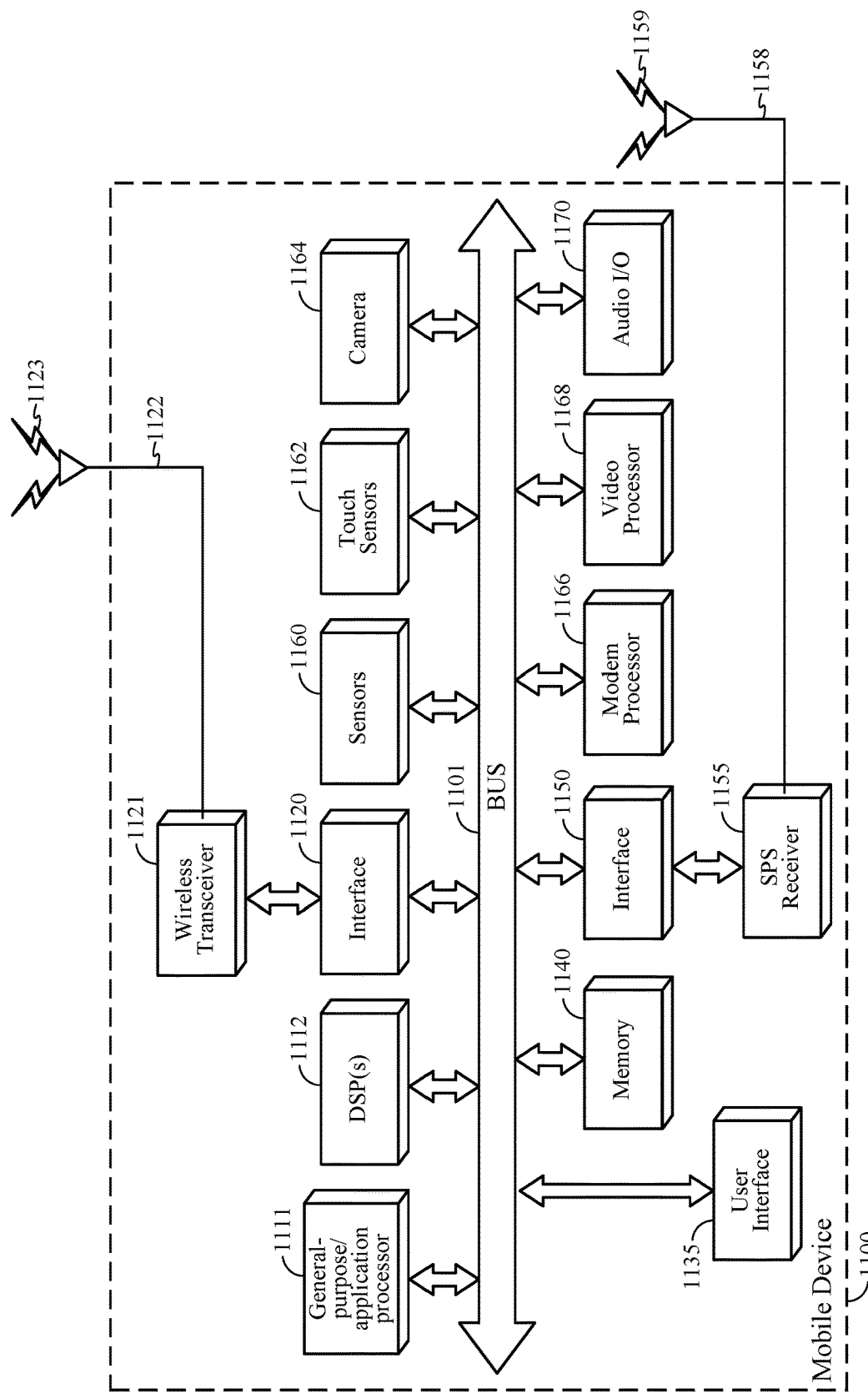
FIG. 18 is a schematic block diagram illustrating an exemplary device, in accordance with an implementation.
Figure 19:
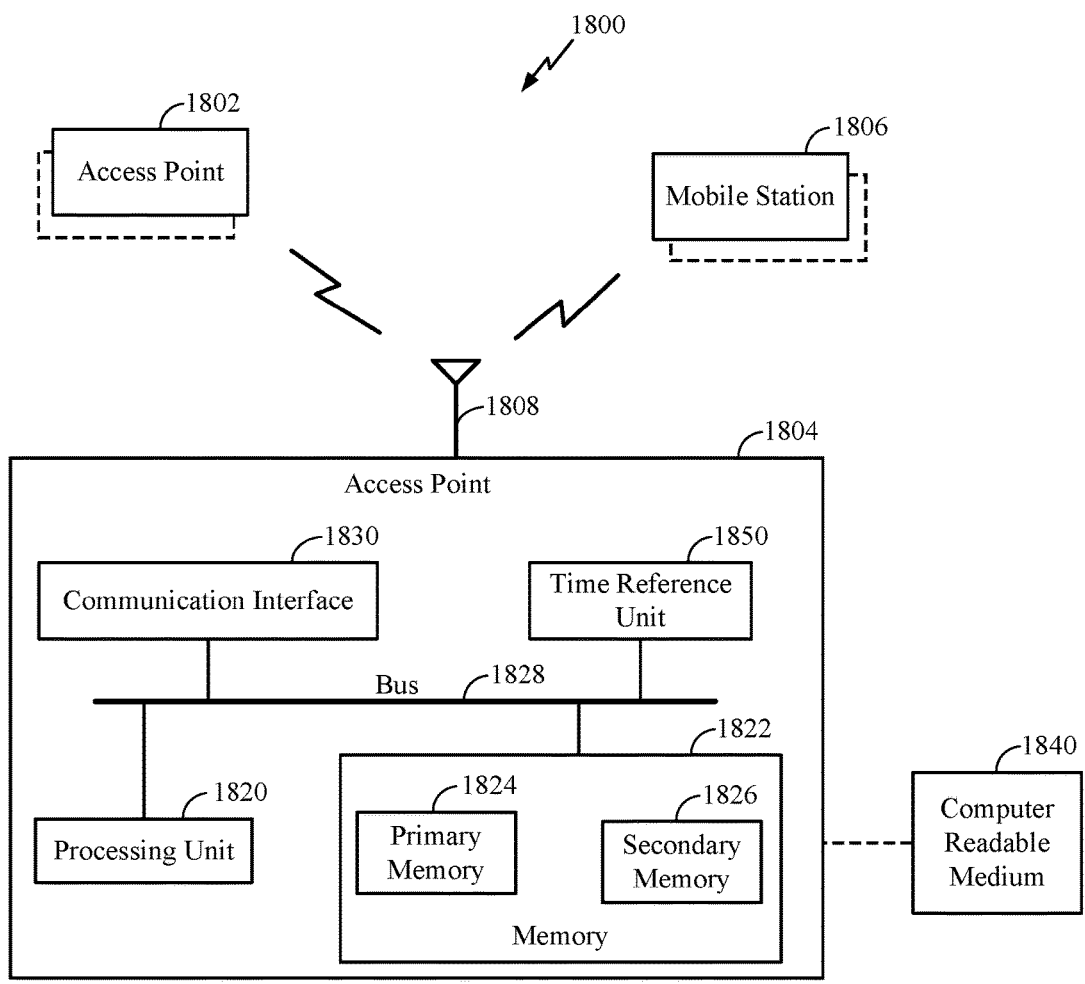
FIG. 19 is a schematic block diagram of an example computing system in accordance with an implementation.

Subject matter shown in FIGS. 18 and 19 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIGS. 6A, 6B, 15A, 15B, 17A and 17B, and corresponding text of the present disclosure.

FIG. 18 is a schematic diagram of a mobile device according to an embodiment. Mobile device 100 (FIG. 1) may comprise one or more features of mobile device 1100 shown in FIG. 18. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCD-MA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 18, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 2 through 17B.

In one particular implementation, transmission of an ACK message in response to a FTM measurement request message may be performed by wireless transceiver device 1121 without instruction or initiation from general-purpose processor(s) 1111 or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140).

Also shown in FIG. 18, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyroscopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

FIG. 19 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 16, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 19, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 19, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/ coupled with processing unit 1820. In a particular implementation, memory 1822 and processing unit 1820 may be configured to execute one or more aspects of process discussed above in connection with FIGS. 2 through 17B.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 2 through 17B.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, trackball, touch screen, data port, etc.

According to an embodiment, a method at a first wireless transceiver device comprises: transmitting a probe request message comprising a radio measurement capabilities element indicating a capability of providing a Range Report; receiving a radio measurement request message comprising one or more fields requesting the Range Report; transmitting a radio measurement response message comprising a Range Report; and receiving a probe response message following transmission of the radio measurement response messages, the probe response message being transmitted in response to the probe request message.

In another embodiment, a method at a first wireless transceiver device comprises: transmitting a probe request message comprising a radio measurement capabilities element indicating a capability of providing a Range Report; receiving an access network query protocol (ANQP) query message comprising one or more fields requesting the Range Report; transmitting an ANQP response message comprising a Range Report; and receiving a probe response message following transmission of the radio measurement response message, the probe response message being transmitted in response to the probe request message.

In another embodiment, a first wireless transceiver device comprises: a wireless transceiver; and a processor coupled to the wireless transceiver configured to: initiate transmission of a probe request message through the wireless transceiver comprising a radio measurement capabilities element indicating a capability of providing a Range Report; obtain a radio measurement request message received at the wireless transceiver comprising one or more fields requesting the Range Report; initiate transmission of a radio measurement response message through the wireless transceiver comprising a Range Report; and obtain a probe response message received at the wireless transceiver following transmission of the radio measurement response messages, the probe response message being transmitted in response to the probe request message.

Another embodiment is directed to a first wireless transceiver device, comprising: a wireless transceiver; and a processor coupled to the wireless transceiver and configured to: initiate transmission of a probe request message through the wireless transceiver comprising a radio measurement capabilities element indicating a capability of providing a Range Report; obtain an ANQP query message received at the wireless transceiver comprising one or more fields requesting the Range Report; initiate transmission of an ANQP response message through the wireless transceiver comprising a Range Report; and obtain a probe response message received at the wireless transceiver following transmission of the radio measurement response message, the probe response message being transmitted in response to the probe request message.

Another embodiment is directed to a first wireless transceiver device, comprising: means for transmitting a probe request message comprising a radio measurement capabilities element indicating a capability of providing a Range Report; means for receiving a radio measurement request message comprising one or more fields requesting the Range Report; means for transmitting a radio measurement response message comprising a Range Report; and means for receiving a probe response message following transmission of the radio measurement response messages, the probe response message being transmitted in response to the probe request message.

Another embodiment is directed to a first wireless transceiver device, comprising: means for transmitting a probe request message comprising a radio measurement capabilities element indicating a capability of providing a Range Report; means for receiving an ANQP query message comprising one or more fields requesting the Range Report; means for transmitting an ANQP response message comprising a Range Report; and means for receiving a probe response message following transmission of the radio measurement response message, the probe response message being transmitted in response to the probe request message.

Another embodiment is directed to a non-transitory storage medium comprising computer readable instructions stored thereon which are executable by a processor of a first wireless transceiver device to: initiate transmission of a probe request message comprising a radio measurement capabilities element indicating a capability of providing a Range Report; obtain a radio measurement request message comprising one or more fields requesting the Range Report; initiate transmission of a radio measurement response message comprising a Range Report; and obtain a probe response message following transmission of the radio measurement response messages, the probe response message being transmitted in response to the probe request message.

Another embodiment is directed to a non-transitory storage medium comprising computer readable instructions stored thereon which are executable by a processor of a first wireless transceiver to: initiate transmission of a probe request message comprising a radio measurement capabilities element indicating a capability of providing a Range Report; obtain an ANQP query message comprising one or more fields requesting the Range Report; initiate transmission of an ANQP response message comprising a Range Report; and obtain a probe response message following transmission of the radio measurement response message, the probe response message being transmitted in response to the probe request message.

Another embodiment is directed to a method at a first wireless station (STA) comprising: receiving a fine timing measurement (FTM) request message from a second STA, the FTM request message comprising one or more fields indicating a range report capability of the second STA. In one particular implementation, the method further comprises transmitting one or more FTM messages from the first STA responsive to the FTM request message. In another particular implementation, the method further comprises receiving an unsolicited radio measurement frame from the second STA comprising a range report based, at least in part, on the one or more FTM messages. Here, at least one of the one or more FTM messages may comprise one or more fields indicating a request for a Range Report. In another implementation, the method further comprises transmitting a plurality of FTM messages from the first STA via a burst of FTM messages; transmitting an access network query protocol (ANQP) request message, the ANQP request message being transmitted by the first STA prior to transmission of a last FTM message in the burst of FTM messages, the ANQP request message comprising one or more fields expressing a request for a Range Report; and transmitting an ANQP response message in response to the ANQP request message.

Another embodiment is directed to a method, at a first wireless transceiver device, comprising: receiving a probe request message transmitted from a second wireless transceiver device comprising a radio measurement capabilities element indicating a capability of the second wireless transceiver device in providing a Range Report; transmitting a radio measurement request message comprising one or more fields requesting the Range Report; receiving a radio measurement response message comprising a Range Report; and transmitting a probe response message in response to receipt of the radio measurement response message.

In another embodiment a method at a first wireless transceiver device, comprises: receiving a probe request message transmitted from a second wireless transceiver device comprising a radio measurement capabilities element indicating a capability of the second wireless transceiver device in providing a Range Report; transmitting an ANQP query message to the second wireless transceiver device comprising one or more fields requesting the Range Report; receiving an ANQP response message comprising the Range Report; and transmitting a probe response message in response to receipt of the ANQP response message.

Another embodiment is directed to a first wireless station (STA), comprising: a wireless transceiver; and a processor coupled to the wireless transceiver to: obtain a fine timing measurement (FTM) request message received at the wireless transceiver from a second STA, the FTM request message comprising one or more fields indicating a capability of the first STA to generate Range Reports. In a particular implementation, the processor is further configured to: initiate transmission of one or more FTM messages through the wireless transceiver to the second STA responsive to the FTM request message. In another particular implementation, the processor is further configured to: obtain an unsolicited radio measurement frame received at the wireless transceiver from the second STA comprising a range report message based, at least in part, on the one or more FTM messages. Here, at least one of the one or more FTM messages may comprise one or more fields indicating a request for a Range Report. In another particular implementation, the processor is further configured to: initiate transmission of a plurality of FTM messages through the transceiver device to the second STA in a burst of FTM messages; initiate transmission of an ANQP request message through the wireless transceiver, the ANQP request message being transmitted prior to transmission of a last FTM message in the burst of FTM messages, the ANQP request message comprising one or more fields expressing a request for a Range Report; and obtain an ANQP response message received the wireless transceiver and transmitted in response to the ANQP request message.

Another particular implementation is directed to a first wireless transceiver device, comprising: a wireless transceiver; and a processor coupled to the wireless transceiver configured to: obtain a probe request message transmitted by the second wireless transceiver device and received at the wireless transceiver comprising a radio measurement capabilities element indicating a capability of the second wireless transceiver device in providing a Range Report; initiate transmission of a radio measurement request message through the wireless transceiver comprising one or more fields requesting the Range Report; obtain a radio measurement response message transmitted by the second wireless transceiver device and received at the wireless transceiver comprising a Range Report; and initiate transmission of a probe response message through the wireless transceiver in response to receipt of the radio measurement response message.

Another embodiment is directed to a first wireless transceiver device, comprising: a wireless transceiver; and a processor coupled to the wireless transceiver and configured to: obtain a probe request message transmitted by a second wireless transceiver device and received at the wireless transceiver comprising a radio measurement capabilities element indicating a capability of the second wireless transceiver device in providing a Range Report; initiate transmission of an ANQP query message through the wireless transceiver comprising one or more fields requesting the Range Report; obtain an ANQP response message transmitted by the second wireless transceiver device and received at the wireless transceiver comprising a Range Report; and initiate transmission of a probe response message through the wireless transceiver following receipt of the radio measurement response message.

Another embodiment is directed to a first wireless station (STA) comprising: means for receiving a fine timing measurement (FTM) request message from a second STA, the FTM request message comprising one or more fields indicating a capability of the second STA to generate Range Reports; and means for transmitting an acknowledgment message to the second STA in response to the FTM message. In a particular implementation, the first STA further comprises: means for transmitting one or more FTM messages to the second STA responsive to the FTM request message. Here, the first STA may further comprise means for receiving an unsolicited radio measurement frame from the second STA comprising a range report message based, at least in part, on the one or more FTM messages. Here, at least one of the one or more FTM messages comprises one or more fields indicating a request for a Range Report.

Another particular embodiment is directed to a first STA comprising: means for transmitting a plurality of FTM messages to the second STA in a burst of FTM messages; means for transmitting an ANQP request message, the ANQP request message being transmitted by the first STA prior to transmission of a last FTM message in the burst of FTM messages, the ANQP request message comprising one or more fields expressing a request for a Range Report; and means for receiving an ANQP response message transmitted in response to the ANQP request message.

Another embodiment is directed to a first wireless transceiver device, comprising: means for receiving a probe request message comprising a radio measurement capabilities element indicating a capability of a second wireless transceiver device in providing a Range Report; means for transmitting a radio measurement request message comprising one or more fields requesting the Range Report; means for receiving a radio measurement response message comprising a Range Report; and means for transmitting a probe response message in response to receipt of of the radio measurement response message, the probe response message being transmitted further in response to the probe request message.

Another embodiment is directed to a first wireless transceiver device, comprising: means for receiving a probe request message transmitted by a second wireless transceiver device comprising a radio measurement capabilities element indicating a capability of the second wireless transceiver device in providing a Range Report; means for transmitting an ANQP query message comprising one or more fields requesting the Range Report; means for receiving an ANQP response message comprising the Range Report; and means for transmitting a probe response message following in response to receipt of the ANQP response message, the probe response message being transmitted further in response to the probe request message.

Another embodiment is directed to a non-transitory storage medium comprising computer readable instructions stored thereon which are executable by a processor of initiating first wireless station (STA) to: obtain a fine timing measurement (FTM) request message received at the first wireless station from a second STA, the first FTM request message comprising one or more fields indicating a capability of the second STA to generate Range Reports. In a particular implementation, the instructions are further executable by the processor to: initiate transmission of one or more FTM messages to the second STA responsive to the FTM request message. In another implementation, the instructions are further executable by the processor to: obtain an unsolicited radio measurement received at the first STA and transmitted by the second STA comprising a range report message based, at least in part, on the one or more FTM messages. Here, at least one of the one or more FTM messages comprises one or more fields indicating a request for a Range Report. In another particular implementation, the instruction are further executable by the processor to: initiate transmission of a plurality of FTM messages to the second STA in a burst of FTM messages; initiate transmission of an ANQP request message, the ANQP request message being transmitted by the second STA prior to transmission of a last FTM message in the burst of FTM messages, the ANQP request message comprising one or more fields expressing a request for a Range Report; and obtain an ANQP response message received at the first STA and transmitted in response to the ANQP request message.

Another embodiment is directed to a non-transitory storage medium comprising computer readable instructions stored thereon which are executable by a processor of a first wireless transceiver device to: obtain a probe request message transmitted by a second wireless transceiver device and received at the first wireless transceiver device comprising a radio measurement capabilities element indicating a capability of the second wireless transceiver device in providing a Range Report; initiate transmission of a radio measurement request message comprising one or more fields requesting the Range Report; obtain a radio measurement response message comprising a Range Report transmitted by the second wireless transceiver device and received at the first wireless transceiver device; and initiate transmission of a probe response message in response to receipt of the radio measurement response message, the probe response message being transmitted further in response to the probe request message.

Another embodiment is directed to a non-transitory storage medium comprising computer readable instructions stored thereon which are executable by a processor of a first wireless transceiver device to: obtain a probe request message transmitted by a second wireless transceiver device and received at the first wireless transceiver comprising a radio measurement capabilities element indicating a capability of providing a Range Report; initiate transmission of an ANQP query message comprising one or more fields requesting the Range Report; obtain an ANQP response message received at the first wireless transceiver device comprising a Range Report; and initiate transmission of a probe response message in response to receipt of the ANQP response message, the probe response message being transmitted further in response to the probe request message.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, bytes, values, elements, symbols, characters, parameters, terms, numbers, numerals, expressions, messages, fields, identifiers, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100a, 100b, 115a and 115b. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn. While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At a first wireless station (STA), a method comprising:
transmitting a probe request message to a second STA, the probe request message comprising one or more fields indicating a range report capability of the first STA;
receiving an access network query protocol (ANQP) request message, the ANQP request message comprising a range report request message;
transmitting an ANQP response message, the ANQP response message comprising a range report; and
receiving a probe response message from the second STA following transmission of the ANQP response message comprising the range report, the probe response message, the probe response message being transmitted in response to the probe request message.

2. The method of claim 1, wherein the one or more fields comprises a radio measurement (RM) Enabled Capabilities field indicating the range report capability of the first STA.

3. The method of claim 1, wherein the one or more fields comprises a radio measurement capabilities element.

4. The method of claim 1, and further comprising:
receiving a plurality of FTM messages from the second STA via a burst of FTM messages, and wherein
the ANQP request message is transmitted by the second STA prior to transmission of a last FTM message in the burst of FTM messages.

5. A first wireless station (STA), comprising:
a wireless transceiver; and
a processor coupled to the wireless transceiver to:
initiate transmission of a probe request message through the wireless transceiver to a second STA, the probe request message comprising one or more fields indicating a capability of the first STA to generate Range Reports;
obtain an access network query protocol (ANQP) request message, received at the wireless transceiver, the ANPQ request message comprising a range report message;
initiate transmission of an ANQP response message through the wireless transceiver, the ANQP response message comprising a range report; and
obtain a probe response message from the second STA, received at the wireless transceiver, following transmission of the ANQP response message comprising the range report, the probe response message being transmitted in response to the probe request message.

6. The first STA of claim 5, wherein the one or more fields to comprise a radio measurement (RM) Enabled Capabilities field indicating the range report capability of the first STA.

7. The first STA of claim 6, wherein the one or more fields to comprise a radio measurement capabilities element indicating the range report capability of the first STA.

8. The first STA of claim 5, wherein the processor is further configured to:
obtain a plurality of FTM messages received at the transceiver device from the second STA in a burst of FTM messages wherein
the ANQP request message is transmitted by the second STA prior to transmission of a last FTM message in the burst of FTM messages.

9. A first wireless station (STA) comprising:
means for transmitting a probe request message to a second STA, the probe request message comprising one or more fields indicating a capability of the initiating STA to generate Range Reports;
means for receiving an access network query protocol (ANQP) request message, the ANQP request message comprising a range report request message;
means for transmitting an ANQP response message, the ANQP response message comprising a range report; and
means for receiving a probe response message from the second STA following transmission of the ANQP response message comprising the range report, the probe response message being transmitted in response to the probe request message.

10. The first STA of claim 9, wherein the one or more fields indicating the range report capability of the first STA comprises a radio measurement (RM) Enabled Capabilities field.

11. The first STA of claim 10, wherein the one or more fields indicating the range report capability comprises a radio measurements capabilities element.

12. The first STA of claim 9, and further comprising:
means for receiving a plurality of FTM messages from the second STA in a burst of FTM messages wherein
the ANQP request message is transmitted by the second STA prior to transmission of a last FTM message in the burst of FTM messages.

13. A non-transitory storage medium comprising computer readable instructions stored thereon which are executable by a processor of initiating first wireless station (STA) to:
initiate transmission of a probe request message to a second STA, the probe request message comprising one or more fields indicating a capability of the first STA to generate Range Reports;
obtain an access network query protocol (ANQP) request message, received at the first STA, the ANQP request comprising a range report request message;
initiate transmission of an ANQP response message, the ANQP response message comprising a range report; and
obtain a probe response message, received at the first STA, from the second STA following transmission of the ANQP response message comprising the range report, the probe response message being transmitted in response to the probe request message.

14. The storage medium of claim 13, wherein the one or more fields indicating the range report capability of the first STA comprises a radio measurement (RM) Enabled Capabilities field.

15. The storage medium of claim 14, wherein the one or more fields indicating the range report capability of the first STA comprises a radio measurement capabilities element.

16. The storage medium of claim 13, wherein the instruction are further executable by the processor to:
obtain a plurality of FTM messages received from the second STA in a burst of FTM messages, wherein
the ANQP request message being transmitted by the second STA prior to transmission of a last FTM message in the burst of FTM messages.

* * * * *